(12) United States Patent
Rolls et al.

(10) Patent No.: US 8,990,198 B2
(45) Date of Patent: Mar. 24, 2015

(54) METHOD AND SYSTEM FOR COMPUTERIZED MANAGEMENT OF RELATED DATA RECORDS

(75) Inventors: Dan Rolls, Rehovot (IL); Iphtach Cohen, Atlit (IL)

(73) Assignee: Ilan Cohn, Herzlia (IL)

( * ) Notice: Subject to any disclaimer, the term of this patent is extended or adjusted under 35 U.S.C. 154(b) by 138 days.

(21) Appl. No.: 12/513,494

(22) PCT Filed: Nov. 4, 2007

(86) PCT No.: PCT/IL2007/001341
§ 371 (c)(1),
(2), (4) Date: Jun. 15, 2009

(87) PCT Pub. No.: WO2008/053493
PCT Pub. Date: May 8, 2008

(65) Prior Publication Data
US 2010/0049736 A1     Feb. 25, 2010

Related U.S. Application Data

(60) Provisional application No. 60/856,020, filed on Nov. 2, 2006, provisional application No. 60/873,255, filed on Dec. 7, 2006, provisional application No. 60/907,560, filed on Apr. 9, 2007.

(51) Int. Cl.
  *G06F 17/30* (2006.01)
  *G06F 7/00* (2006.01)
(52) U.S. Cl.
  CPC ....... *G06F 17/30294* (2013.01); *Y10S 707/955* (2013.01)
  USPC ............ 707/736; 707/610; 707/714; 707/955
(58) Field of Classification Search
  None
  See application file for complete search history.

(56) References Cited

U.S. PATENT DOCUMENTS

| | | | |
|---|---|---|---|
| 5,086,504 A * | 2/1992 | Nemeth-Johannes et al. | 717/143 |
| 5,220,501 A | 6/1993 | Lawlor et al. | |
| 5,295,256 A * | 3/1994 | Bapat | 717/137 |
| 5,295,261 A * | 3/1994 | Simonetti | 1/1 |
| 5,467,471 A * | 11/1995 | Bader | 1/1 |
| 5,647,058 A * | 7/1997 | Agrawal et al. | 1/1 |
| 5,857,028 A | 1/1999 | Frieling | |

(Continued)

FOREIGN PATENT DOCUMENTS

FR     2814563 A1     3/2002

OTHER PUBLICATIONS

Legacy, Legacy 5.0 Family Tree, Retrieved from https://web.archive.org/web/20041215000552/http://www.legacyfamilytree.com/TourMerge.asp, Dec. 15, 2004, pp. 1-6.*

*Primary Examiner* — Jung Kim
*Assistant Examiner* — James J Wilcox
(74) *Attorney, Agent, or Firm* — Browdy and Neimark, PLLC

(57) ABSTRACT

A method and system are presented for merging a first family tree to a second family tree. The method comprises: providing a plurality of first matrices associated with the first family tree and a plurality of second matrices associated with the second family tree, each matrix comprising attributes on individuals that are linked to one another by a predetermined link; identifying substantially identical first and second matrices in said pluralities of first and second matrices; and generating data indicative of a merge of the family trees to one another if a number of the substantially identical matrices exceeds a predefined number.

18 Claims, 13 Drawing Sheets

(56) References Cited

U.S. PATENT DOCUMENTS

| | | |
|---|---|---|
| 5,903,893 A * | 5/1999 | Kleewein et al. ............. 707/714 |
| 6,014,664 A * | 1/2000 | Fagin et al. ................... 707/694 |
| 6,665,677 B1 | 12/2003 | Wotring et al. |
| 6,704,787 B1 | 3/2004 | Umbreit |
| 6,742,001 B2 | 5/2004 | Ripley |
| 6,760,731 B2 * | 7/2004 | Huff ..................................... 1/1 |
| 6,910,044 B2 | 6/2005 | Weinberg et al. |
| 7,047,202 B2 | 5/2006 | Jaipuria et al. |
| 7,047,204 B1 | 5/2006 | Wood et al. |
| 7,512,676 B2 * | 3/2009 | O'Neal et al. ................ 709/223 |
| 7,536,064 B2 * | 5/2009 | Venkatesan et al. .......... 382/305 |
| 7,860,318 B2 | 12/2010 | Mandelbaum et al. |
| 7,890,507 B2 * | 2/2011 | Kilroy ........................... 707/736 |
| 8,036,907 B2 * | 10/2011 | Davies et al. .................. 705/1.1 |
| 8,095,567 B2 * | 1/2012 | Cookson et al. ............. 707/797 |
| 2001/0037451 A1 | 11/2001 | Bhagavatula et al. |
| 2002/0032687 A1 | 3/2002 | Huff |
| 2002/0049806 A1 | 4/2002 | Gatz et al. |
| 2002/0095357 A1 | 7/2002 | Hunter et al. |
| 2003/0014422 A1 | 1/2003 | Notargiacomo et al. |
| 2003/0115459 A1 | 6/2003 | Monk |
| 2003/0126092 A1 | 7/2003 | Chihara |
| 2003/0182621 A1 | 9/2003 | Mazza et al. |
| 2003/0220980 A1 | 11/2003 | Crane |
| 2004/0010472 A1 | 1/2004 | Hilby et al. |
| 2005/0022239 A1 | 1/2005 | Meuleman |
| 2005/0137899 A1 * | 6/2005 | Davies et al. ..................... 705/1 |
| 2005/0149497 A1 | 7/2005 | Cookson, Jr. et al. |
| 2005/0149522 A1 * | 7/2005 | Cookson et al. .................. 707/7 |
| 2005/0171832 A1 | 8/2005 | Hull et al. |
| 2006/0173792 A1 | 8/2006 | Glass |
| 2007/0005601 A1 | 1/2007 | Gaucas |
| 2007/0033203 A1 | 2/2007 | Nemazi et al. |
| 2007/0143625 A1 | 6/2007 | Jung et al. |
| 2007/0266003 A1 * | 11/2007 | Wong et al. ....................... 707/3 |

* cited by examiner $U_A$-$B_2$-$B_3$-$C_1$-$C_2$-$C_4$-$C_3$-$D_1$-$A_1$-$A_2$-$A_3$-$A_4$-$B_1$-$B_4$-$B_5$-$C_5$-$U_B$-$C_7$-$C_6$-$D_2$-$D_3$ $U_B$-$B_4$-$B_5$-$C_6$-$D_2$-$D_3$-$C_5$-$C_7$-$A_3$-$A_4$-$A_5$-$A_6$-$B_3$-$B_2$-$C_1$-$C_2$-$U_A$-$C_4$-$C_3$-$D_1$-$B_6$-$C_8$-$B_8$-$C_9$-$C_{10}$-$C_{11}$-$D_4$-$D_5$-$A_7$-$A_8$-$B_9$

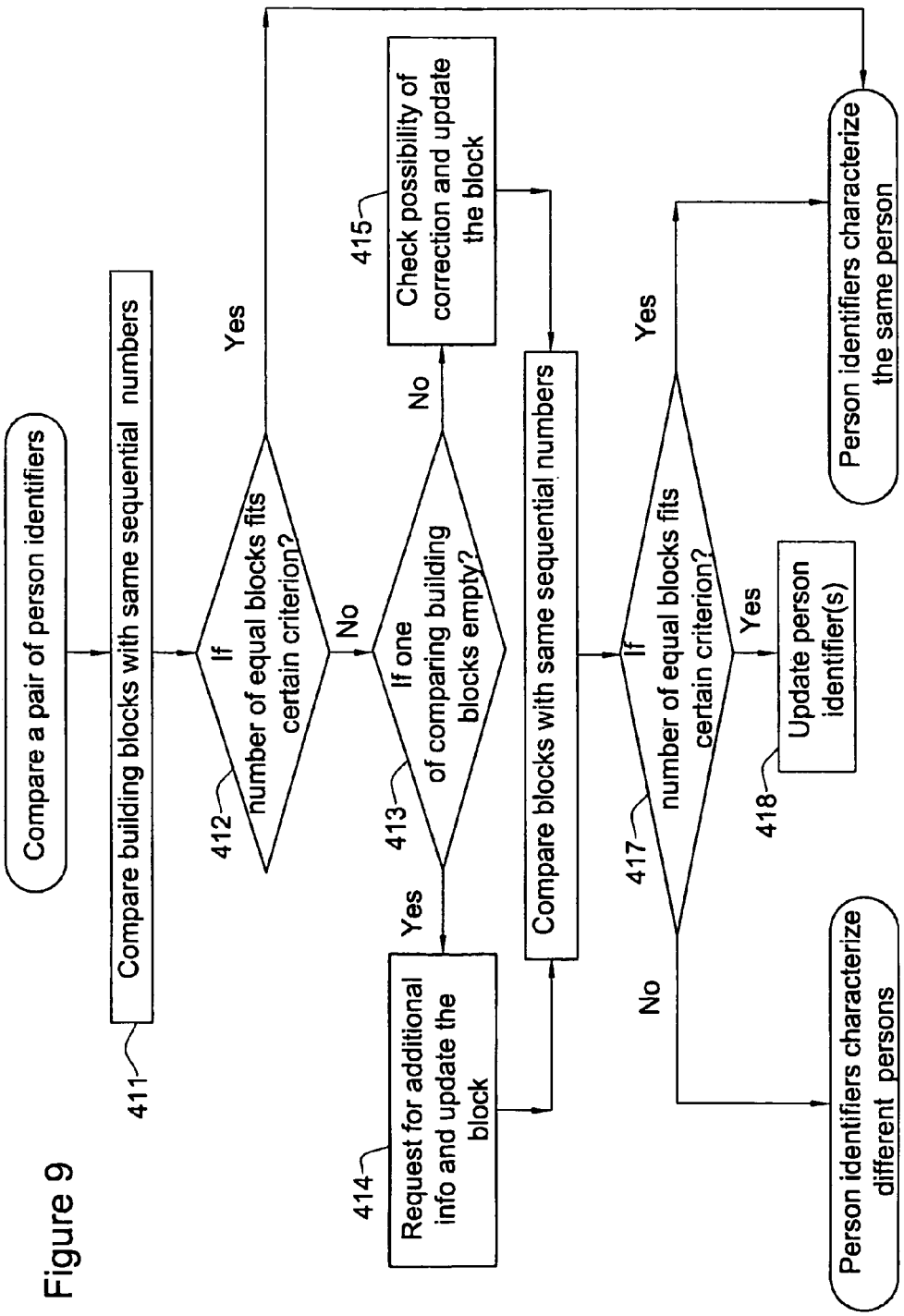

METHOD AND SYSTEM FOR COMPUTERIZED MANAGEMENT OF RELATED DATA RECORDS

CROSS REFERENCE TO RELATED APPLICATIONS

This application is a national stage of international application PCT/IL2007/001341, filed 4 Nov. 2007. Additionally, this application claims the benefit of the following: U.S. Provisional Application No. 60/856,020, filed 2 Nov. 2006; U.S. Provisional Application No. 60/873,255, filed 7 Dec. 2006, and U.S. Provisional Application No. 60/907,560, filed 9 Apr. 2007.

FIELD OF THE INVENTION

This invention relates to methods and systems for computerized management of data records, and in particular, to computer-based identification and management of related data records.

BACKGROUND OF THE INVENTION

Computerized management of related data records may be applied in different fields as, for example, genealogy and investigation of family history, catalog data management, document versions management, circuits and/or software testing management and other applications.

The problems of management of related data records as well as corresponding family-tree generation have been recognized in the art and various systems and methods have been developed to provide a solution, for example:

U.S. Pat. No. 6,665,677, to Wotring et al., describes a system and method for transforming a relational database to a hierarchical database. The invention comprises a computer-implemented method for transforming data in a relational database to a hierarchical database. It comprises creating an import map that maps each relational database field to a hierarchical field in the hierarchical database using a relational database schema and a hierarchical database schema, using the import map to import data from the relational database; and transforming the relational data into hierarchical documents. The method further comprises creating a hierarchical database schema that corresponds to the relational database schema. The hierarchical documents may be stored in computer memory or on disk.

U.S. Pat. No. 6,742,001 to Ripley, describes a system and method for sharing data between hierarchical databases. The computer-implemented system and method described therein allow data from a first hierarchical data structure to be applied to a second hierarchical data structure. The method comprises recursively comparing the source elements of the first hierarchical structure to the target elements of the second hierarchical structure, and applying the data from a source element or source child element to a matching target element or target child element. The method is iterated, until all elements of the second hierarchical data structure have been traversed.

U.S. Pat. No. 6,760,731, to Huff, describes a worldwide genealogy data storage and retrieval system for implementation on the internet, wherein genealogical data from every source can be collected, reviewed, revised, extended, consolidated, summarized, indexed, lineage-linked, and displayed. The invention further relates to a method and apparatus for cooperative publishing and distribution of genealogical data. The invention allows owners of lineage-linked genealogical data to publish the data in any size increments and for buyers to select and retrieve any number of names and associated data. An integrated micropayment system requires users of the data to make payments for each increment of data received, and royalties are paid to the owners of the data from these payments.

U.S. Pat. No. 6,910,044, to Weinberg, et al., entitled "Method and apparatus for structuring, maintaining, and using families of data" discloses a method and apparatus for structuring, maintaining, and using families of data. According to the invention disclosed by Weinberg, et al., given one or more sets of partitioning data, one may construct a set of families based on the values of fields and attributes of the records in a database system. The families are stored and managed in separate tables. The records in data tables are identified as belonging to one or more families, while families may be represented in a hierarchical structure. Families may also inherit from each other based on a parent to child relationship also stored in the database.

U.S. Pat. No. 7,047,202 to Jaipuria et al., describes a method and apparatus for optimizing networking potential using a secured system for an online community. The system allows for users to search networks, both their own network and their peers' networks, all under the umbrella of a "multiple level access" security system. The present invention has been designed to optimize networking capabilities among users in a comprehensive online community. Networking among such a secured environment will allow users an opportunity to enhance their networking potential by expanding their networks to their peers' and beyond. A user registers with the online community and personally adds individuals that they know to their personal networking database. While adding these peers to the networking database, the user grants a specific level of access to each individual. This security measure is devised to discourage solicitation from other unwanted online users. The levels of access give the user an opportunity to control the amount of personal information, including contacts that they make, available to their individual peers. Based on the level of access granted by the user, the peer may or may not be able to access the users' information or the user's personal databases for potential networking. The level of access granted by two individuals need not be the same for each other.

US Patent Application No. 2002/032687, to Huff, entitled "Genealogy registry system" discloses a genealogy data storage and retrieval system for implementation on the Internet, wherein genealogical data from different sources can be collected, reviewed, revised, extended, consolidated, summarized, indexed, lineage-linked, and displayed.

US Patent Application No. 2003/14422 (Notargiacomo et al.) entitled "Method and system for building a family tree" discloses a method, system and computer software product for gathering information relevant to the creation of a family tree. Searching of multiple databases is done through a communication network for obtaining relevant information and assessing the probability that the newly identified individual is related to the original individual.

US Patent Application No. 2005/149497 (Cookson et al.) entitled "Genealogical investigation and documentation systems and methods" discloses a method of creating a family tree, the method includes receiving a request from a user to return a file that includes the family tree and using a plurality of primary source records to construct the family tree based on the request, wherein the records may indicate multiple alternatives for at least one branch of the family tree.

French Patent Application No. 2814563 (Hergault) entitled "Method allowing genealogy database users to exchange genealogy information over the Internet" discloses a method involving extraction of statistical information from databases comprising genealogy information, transmission of statistical information to a server-router, transmission of a request from an end-user, server comparison of request to the statistical information, transmission of the request from the server to a number of users, transmission of genealogy data from end-users to the requesting end-user via the Internet.

SUMMARY OF THE INVENTION

The present invention is directed to methods, systems and computer program products for computerized consolidation of data records among plurality of data records, each data record comprising at least one sub-record assigned to a corresponding object.

Thus, by a first aspect the present invention provides a method for computerized consolidation of data records among plurality of data records, each data record comprising a main record on a first object and at least one sub-record assigned to a second object related to the first object, the method comprising: (a) comparing a first data record with one or more second data records; and (b) consolidating the first data record and at least one of the second data records responsive to determining a match between comparative data items in the first and second data records, said comparative data items comprising data from one or more such sub-records.

Thus, by the method of the invention the first data record and the second data records are processed; the match between some or all of the comparative data items is determined; and responsive to determining a match of one or more comparative data items the first data record is consolidated with one or more second data record. The comparative data items are typically a sufficient number of such data items so that either the majority of the comparative data items or a number sufficient so as to make it probable—according to pre-defined criteria—that the first and the second data items match one another.

The comparative data items may include the entire sub-records or may include a characteristic or representative part thereof. A characteristic or representative part may include one or more values or data bit that define the sub-record. For example, where said first object is a first person and said one or more second objects are one or more second persons related in some way to the first person, in accordance with a preferred embodiment to be described below, a characteristic part of the sub-record may be the second person's name, address, profession, etc. At times the comparative data items may include all of the respective sub-records.

The term "match" should be understood to signify identity of comparative data records; or to signify that two matching comparative data records, albeit not identical, are similar so as to relate to the same data record with a high degree of probability. For example, in the case the comparative data record is a name of an individual, for instance and individual named Josef, a similar data may relate to an individual by the name of Joe, Yosef, Yossi, etc.

The term "object" should be understood to relate both to a physical entity, such as an individual, a piece of merchandise, and others, as well as to a virtual entity such as an electronic record or document, a software, etc. The term "object" relates, according to a particular example of a preferred embodiment of the invention, to personal data items on an individual and the data record includes the family tree of that individual. According to such preferred embodiment the main record is personal data on said individual and the sub-records comprise data pieces relating to individuals included in the family tree. In accordance with this embodiment, the method and system of the invention are used for merging of related family trees. Related family trees include family trees with overlapping data, according to defined criteria. The merging of family trees according to this embodiment generates a consolidated family tree from one or more a priori separated ones. In accordance with an embodiment of the invention a comparative set of data items is generated for each data record, e.g. personal data record, and the consolidation occurs in case of identity of sufficient number, at times the majority, of comparative data items in the comparative set, between the two data records. The comparative data set may be represented in a linear or a two dimensional array of comparative data items. For example, the comparative data set may be represented as a computer-generated string sequence comprising a predefined set of building blocks, e.g. organized in predefined sequence order. The number of matching building blocks between two data records can determine the probability of match between the two data records. By one embodiment, the sub-records in the comparative data set comprise names of persons related to the first person. For examples, where the building blocks of the comparative data set include data on relatives, two personal data records that with a comparative data set including names of parents and grandparents, let say, cannot be regarded as matching records with high probability, as the same identifiers may also be applicable to siblings. Other matching data items in the comparative data set, for examples names of siblings, may increase the probability of match between different personal data records.

The method of the invention is useful for a variety of other applications in which a multiple data records may exist that relate to the same object. Examples of such data records are: different version of the same document in a computer network, where the first object is the document and the one or more second objects being attributes such as the time of creation, the time modifications were made, the subject, the author, etc.; different versions of the same software in a computer network, e.g. a software in development where the different version were created as a result of different inputs be different software developers, where the first object is the software and the one or more second objects being attributes such as the time of creation, the time modifications were made, the subject, the identity of the development team, the project code, etc.; multiple copies data records on inventories, where the first object is the stored item and the one or more second objects may be attributes, such as product nature, manufacturer, time of manufacture, origin, destination, etc. A typical, albeit not exclusive application of the invention is in a case where different computer or network users may enter or edit said data records. Examples are: data records on results of scientific experiments where different scientists or research assistants may input the data, at times scientist or research assistants at different locations, where the first object is the nature of the experiment and the one or more second objects may be the experimenter, the laboratory where the experiment was done, reagents origin, name of experimenter, etc.; data records on a joint project, where the first object is a description of the project and the one or more second objects may include description of sub-assignments, project participants, target completion date, etc.

The terms "consolidation", "consolidating", etc., refers to combining, uniting or fusing data records to form one consolidated data record. The consolidation may involve updating a first data record with data contained in the one or more second data records, or vice versa; or may involve providing a link in one or both of the consolidated data records to data in the other or making reference to such data in one or both of the data records to the other data record; or any other solution that will give rise to essentially or substantially combining the consolidated records into one. It should be noted that in the case, for example, where the two consolidated data records are included originally in different data bases, the consolidated data records may still have separate, albeit identical entries in the two databases.

According to an embodiment of the invention, said consolidating occurs following matching of comparative data items comprising, for example, at least five, at times at least six, occasionally at least seven and often at least eight items. According to some embodiments of the invention each of the different items among the comparative data items has the same weighting factor for determining a match. According to other embodiments of the invention different such data items may have different weighting factors for determining a match. In the latter case, a match may be determined not on the basis of the number of said data items but rather, for example, on the basis of a total or average weighting factor of data items.

According to some embodiments, the matching makes use of a phonetic algorithm. This may be important in cases where data may be input in different manners, such as in the case of data records which are personal data records (to be discussed below).

The consolidation of the data records is carried out on the basis of matching of a comparative data set that includes one or more data items, typically data items of sub-records. The comparative data items may include the entire sub-record or may include a selected, typically identifying-portion out of the sub-record.

According to some embodiments of the invention the consolidation involves determining probability that said first and said second data records are identical on the basis of the number or another value (e.g. cumulative or average weighting factor) relating to comparative data items in the two records, and then consolidating said first and second data records where said probability exceeds a predetermined level.

The method of the invention is applicable both where the first and the second data records are included in the same database as well as in the case where the data records to be consolidated are included in different databases, for example databases that are intended to be merged with one another.

Typically, the comparative data items may be represented as a data set comprising a matrix of data items. The matrix may be one-, two- or multi-dimensional arrangement of data items. A linear matrix may consist of a predefined sequence of comparative data items. For example: where the object is an electronic document, the predefined sequence may consist of a series of comparative data items listed in a predefined order that relate to the document's nature, originator, date of creation, etc.; where the object is a person, the comparative data set may consist of a predefined order of comparative data items that may include, for instance, a name of other individuals with a predefined relationship with the person, arranged in a predefined order.

The method of the invention is typically carried out over a computer network, e.g. the Internet.

A preferred embodiment of the invention is the case were said object is a person, said data record is a personal data record, said main record is data record on person and the sub-records are data on other persons relating to the first one.

In accordance with this preferred embodiment there is thus provided a method for computerized consolidation of personal data records among plurality of personal data records, each of said data record comprising a main record on a first person and at least one sub-record assigned to a second person that is related to the first person, the method comprising: (a) comparing a first personal data record with one or more second personal data records; and (b) consolidating the first data record and at least one of the second data records responsive to determining a match between comparative data items in the first and second data records, said data items comprising data from one or more of said sub-records. In accordance with some particularly preferred embodiments one or both of the first or the second personal data records are in a form of a family tree database. The term "family tree" should be construed in a broad sense as relating to a data base of a plurality of persons and at least some of their familial relationship. The family tree may be represented graphically in one of many different graphical representation means of such information; may be stored as data records within a computer system or stored in a manner that enables to reconstruct the data record, for example from multiple distributed data pieces (the data record including at least one identifier for each person and one or more family relationships to one or more other individuals in the family tree); or both. A family tree may also be thought of as a graph (which may be graphically represented or virtually represented within a computer system) in which connecting lines represent the family relationships and the nodes represented the persons of the family tree (to be referred to herein at times as "nodes"). See also the definition further below.

In accordance with a further preferred embodiment, the consolidation further comprises merging a first family tree data record with one or more second family trees data records to generate a merged family tree. The consolidation may further comprise consolidating multiple nodes in two or more merged family trees, each node representing a personal data record.

By one embodiment the invention provides a method for computerized management of a plurality of family trees, each family tree having a plurality of nodes, each of which represents a first person with associated personal data record, the method comprising: for each personal data record, assigning one or more sub-records to one or more second persons relating to said first person, the sub-records comprising data on the second persons and their relationship to the first person; comparing the personal data records with the personal data records from the plurality of family trees and identifying at least two trees that comprise each a predefined number of common nodes that represents the same individuals, the identification comprises determining existence of matching comparative data items in the personal data records associated with the nodes, the comparative data items comprising data from one or more sub-records; and merging said at least two trees with one another to yield a merged family tree which comprises at least some of the nodes common to said at least two trees. At times, for the purpose of merging two or more family trees a plurality (2, 3, 4, 5 or more) of common nodes may be required.

Each person may be a member in different capacities in different family trees. For example, a person A may be included in one family tree of a person B by marriage to a 'blood' relative of person B; person A may also included as a 'blood' relative, e.g. a grandchild of a family tree of another person C. The consolidation of the personal data records of such a person included in two or more family trees, allows the merging of such a priori separate family trees into one big family tree.

In some examples, the comparative data items of the first and/or the second personal data record are in a form of a graphical display of a family tree. In such a case pattern recognition algorithms may be employed as part of the data record consolidation procedure.

The merging of the family trees may include the process of importing, exporting, transforming and/or superimposing that may involve: (a) merging a database record in the first family tree with a graphical display record in the one or more second family trees; (b) merging personal data records from two or more family trees; (c) merging a graphical display record in the first family tree with a graphical display record in one or more other family trees; (d) consolidating person-indicating nodes comprised in the first family tree with person-indicating nodes in the one or more second family trees; and others.

In accordance with one embodiment of the invention the comparative data items are represented as one or more sequences or strings of data pieces. According to this embodiment there is thus provided a method for computerized management of at least two family trees, each family tree being identified by a plurality of relationship sequences, the method comprising: identifying at least one first family tree of said at least two family trees having at least one matching sequence with at least one second family tree of said at least two family trees; and merging said at least one first family tree to said at least one second family tree into one consolidated family tree.

According to one embodiment, the data sequence consists of data pieces relating to an individual included in the family tree, the position of the data piece in the sequence being predetermined based on familial relationship. A data piece relating to an individual may be the individual's name or any other personal attribute. A sequence of data pieces may thus include, for example, a sequence of names of individuals included in the family tree, their position in the sequence being identified by their relationship to the person X whose family tree it is. An exemplary, non-limiting sequence is one such as person X-father of X-mother of X-brother of X-sister of X-grandfather of X- . . . .

A family tree is a relationship network in which the individuals are the nodes and the relationships are connecting lines between them. The term "nodes" should be understood to denote individuals represented in the family trees. The term "connecting lines" should be understood to denote a representation of relationships between individuals. For example, a single line connecting two nodes represents a first degree family relationship—between a parent and a child, between two siblings and between two members of a couple (e.g. husband and wife). A second degree relationship, e.g. between one individual and an uncle/aunt or between one individual and a brother/sister-in-law, between a grandparent and a grandchild, etc., will be represented by a two-segment connecting line going through another node. For example, for an individual-uncle a two-segment connecting line will include a first segment from the individual to his/her parent and a second line from the parent to a sibling of the parent. It should be understood that the terms "node" and "connecting lines" are functional terms and should not be construed in a descriptive or graphical sense. While a family tree may be represented as such nodes with connecting lines, it may also, by other embodiments, be represented in the form of a table of data fields, or may be graphically represented in any other form.

According to an embodiment of the invention, said data sequences include pieces of the network data, namely nodes and connecting lines. At minimum such sequences include each a pair of nodes and the connecting line between them. For example a pair of nodes representing: parent-child; first sibling-second sibling; person-spouse. Such a sequence may also include more than two nodes and more than one connecting line. For example, sequences such as: Grandparent-child-grandchild; child-parent-uncle/aunt; person-sister-brother-in-law; child-parent-parent's child from another marriage; father-son-daughter-in-law (DIL)-DIL father; etc. For two family trees to merge, the matching sequences should be sufficient to determine a match between the two family trees with a sufficiently high probability. A sufficiently high probability may be defined by an optimized minimal number of matching nodes and possibly also their weighting factor. A weighting factor may take into account, for example, the family distance (degree of relationship) between the data-entering individual and the individual who is represented by a certain node (seeing that the accuracy of the data on an individual may diminish with increasing relationship distance between a data-entering individual and the individuals regarding whom data was input). The weighting factor may also take into consideration the scarceness of a certain data item (e.g. a very rare name may get a high weighting factor). Thus, typically for a match between two family trees to be determined and for the trees to thus merge, the matching sequences should include a number of common nodes which are not less than a certain pre-determined number, and/or a minimum number of pairs of directly connected nodes. For example, the minimum number of pairs of nodes to determine a match may be 2, 3, 4, 5, 6, 7, 8, 9, or 10 (the minimum number depending, among others, on the weighting factor).

According to an embodiment, the family tree-merging process between a first family tree and a second family tree comprises converting each of the family trees into a plurality of matrices, each of which consists of attributes of at least two individuals linked to one another by a predetermined link, including: a direct link, e.g. parent-sibling, husband-wife; or indirect ling such as sibling 1-sibling 2 (connected through a parent), grandparent-grandchild, etc. The attributes may be arranged in a predefined linear sequence. Also, each attribute may be given a numerical value to thereby define a vector in a 2-, 3- or multi-dimensional space. Thus a plurality of first matrices, sequences or vectors associated with the first family tree and a plurality of second matrices, sequences or vectors associated with the second family tree are thereby generated. The family tree-merging process then comprises locating a minimal number of substantially identical matrices, sequences or vectors in the two family trees. The term "substantially identical" should be understood as also encompassing the situation of identity as well as substantial identity, namely a slight mismatch that does not change the property of the two matrices or vectors of being identical. This is the case, for example, where a certain attribute (e.g. name of a father) is missing from one of the two family trees but included in the other. Additionally, a probability of identity factor may be added and factored-in in determining a match between family trees.

Typically, each such matrix consists of two individuals that are directly connected to one another, each with a minimal number of attributes that define the individual. By way of example, such attributes may consist of name of the individual, name of mother and name of father, in a predefined order. A corresponding matrix or vector may include these attributes for each of two directly connected individuals, typically arranged in a pre-defined order. In case of a family tree including a person A who is a father of person B, a vector may be constructed from the numerical values given to each of the attributes in the sequence: name of A-name of father of A-name of mother of A-name of B-name of father of B (which in this case is A)-name of mother of B; etc. A match between the first family tree and the second family tree may be defined where the two contain a minimal, predefined number of identical vectors that defines a match with a high degree of probability. The minimal number may depend on a number of factors including, for example: a definition of an acceptable level of a false positive result; on cultural or society-dependent factors, e.g. in dependence on name-usage patterns (in societies are cultures where a wide variety of different names are used, the minimal numbers of vectors to define a match may be low; where a society is characterized by repetitive use of the same names in a family the minimal number may be high). The minimal number of matching vectors to define a match will typically be 2, 3, 4, 5, 6, 7, 8, 9, 10, 11, 12, 13, 14 or 15.

It is to be noted, by way of example only, that a family tree that includes a grandfather A, and grandmother B, their siblings C and D, respective spouses E and F and respective children G and H and I and J, may yield vectors of individuals and their attributes in as follows (or vice versa): A-B, A-C, A-D, B-C, B-D, C-E, D-F, C-G, C-H, E-G, E-H, D-I, D-J, F-I, F-J.

The merging process may be automatically initiated at the computer system upon determination of a match; or may be a user-initiated process, for example after a computer prompt. Additionally, the merge upon a match may occur automatically within the computer and be made visible (e.g. graphically displayed) to the user only upon user initiation. A merged family tree may be graphically represented as such to a user in a variety for different graphical representation means; a user may be permitted to navigate, by one of a variety of navigation tools, from one merged family tree to another, through junctions between different family trees, the junctions being formed by one or more consolidated personal data records; a user may be provided with means to display sequences of the merged family trees; etc.

The merged personal records may at times be originally included in the same database, or may at time be originally included in separate databases, e.g. databases that are consolidated with one another.

By another of its aspects, the present invention provides a method for merging a first family tree to a second family tree, comprising: providing a plurality of first matrices associated with the first family tree and a plurality of second matrices associated with the second family tree, each matrix comprising attributes on individuals that are linked to one another by a predetermined link; identifying substantially identical first and second matrices in said pluralities of first and second matrices; and generating data indicative of a merge of the family trees to one another if a number of the substantially identical matrices exceeds a predefined number.

The data indicative of the merge may include a note to the user that the match has been determined and a merged tree can be or have been created, or may include data indicative of the merged tree itself.

Each matrix may include attributes on individuals with a direct family link. The attributes may be arranged in a predefined linear sequence. Each attribute may be given a numerical value so as to define a vector for each sequence and step (b) comprise searching for substantially identical first and second vectors.

By yet another of its aspects the present invention provides a system for computerized consolidation of data records among plurality of data records, each of the data records comprising a main record on a first object and at least one sub-record assigned to a second object related to the first object, the system comprising: a processor utility configured to process data indicative of said data records, to determine a match between one or more comparative data items each of which consisting of a sub-record or comprising a characteristic part of a sub-record, and (iii) responsive to determining the match of one or more comparative data items, generating data indicative thereof enabling consolidating the first and the one or more second data items; and a storage utility for storing the consolidated data records.

The system in accordance with a preferred embodiment is intended for computerized consolidation of personal data records among plurality of personal data records, each of the personal data record comprising a main record on a first person and at least one sub-record assigned to a second person related to the first person.

The system according to this embodiment for computerized management of at least two family trees, each of which being identified by a plurality of relationship sequences, comprises: a computer system configured as a server system accessible by users of a computer network through a client-server communication session, comprising a memory utility for storing a database relating to family trees, a first processor utility for constructing family trees on the basis of data stored in said database and a second processor utility for searching and identifying in at least two family trees at least one matching sequence and merging said at least two family trees into one consolidated family tree.

The system of the invention is useful for carrying out the method as described herein.

The invention also provides a computer program product comprising a computer readable medium having computer readable program code embedded therein for causing the computer to perform the method as described and defined herein.

Also provided by a further aspect of the invention is a program storage device readable by machine, tangibly embedded therein a program of instructions executable by the machine to perform a method of the invention as defined or described herein.

The invention further provides a database of consolidated data records obtained by the method of the invention as defined or described and defined herein.

Those skilled in the art will readily appreciate that invention is not limited in its application to genealogical related data records and family trees. The invention is, likewise, capable of other embodiments and of being practiced out for various applications of related data records.

BRIEF DESCRIPTION OF THE DRAWINGS

In order to understand the invention and to see how it may be carried out in practice, embodiments will now be described, by way of non-limiting example only, with reference to the accompanying drawings, in which:

FIG. 9 illustrates an example of a method of the present invention of managing person identifiers;

DETAILED DESCRIPTION OF EXEMPLARY EMBODIMENTS

Figure 1A:
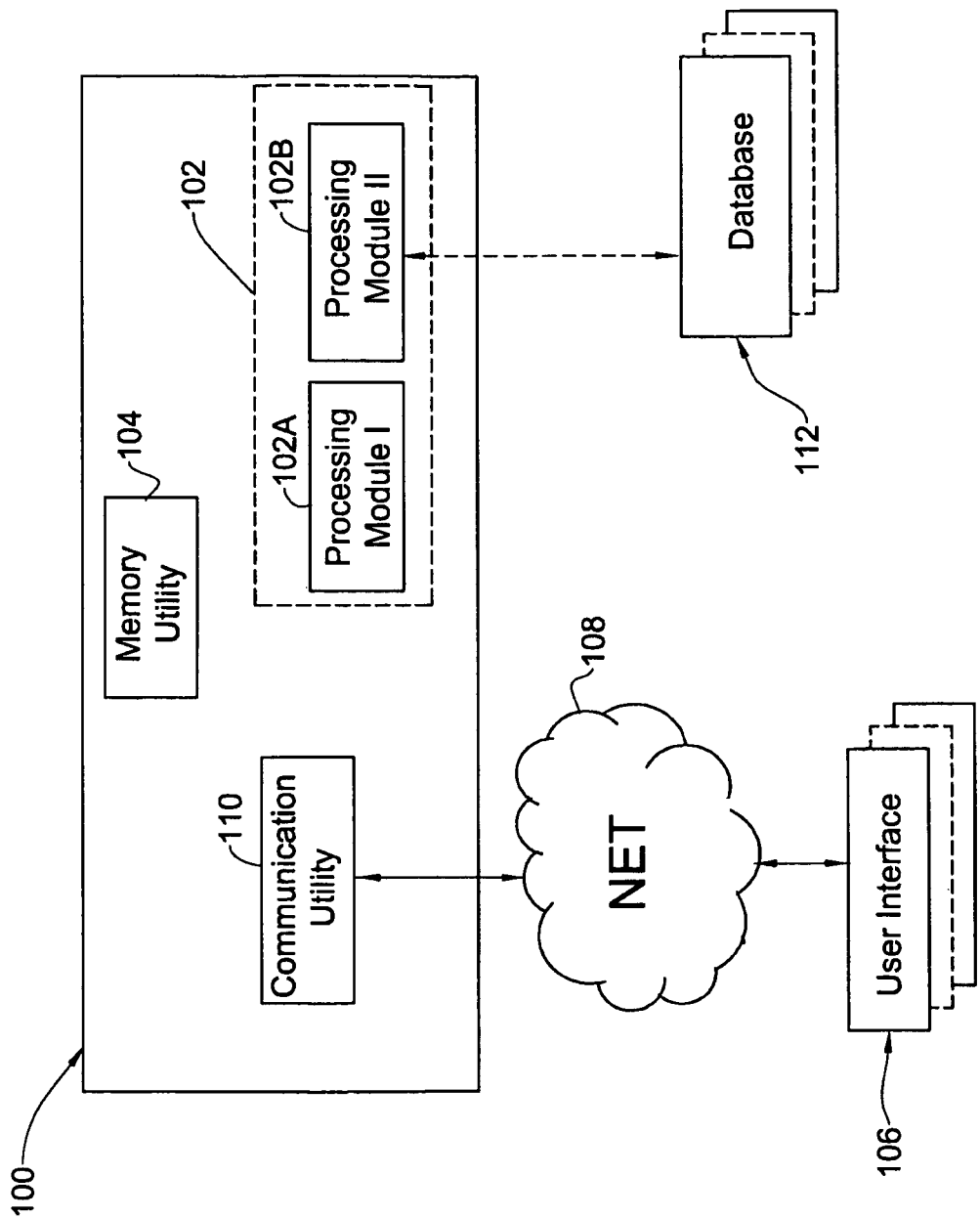
FIG. 1A illustrates a block diagram of a data records management system according to an embodiment of the invention.

In the following detailed description, numerous specific details are set forth in order to provide a thorough understanding of the invention. However, it will be understood by those skilled in the art that the present invention may be practiced without these specific details. In other instances, well-known methods, procedures, components and circuits have not been described in detail so as not to obscure the present invention.

Unless specifically stated otherwise, as apparent from the following discussions, it is appreciated that throughout the specification discussions utilizing terms such as "processing", "computing", "calculating", "determining", "deriving", "generating" or the like, refer to the action and/or processes of a computer or computing system, or processor or similar electronic computing device, that manipulate and/or transform data represented as physical, such as electronic, quantities within the computing system's registers and/or memories into other data, similarly represented as physical quantities within the computing system's memories, registers or other such information storage, transmission or display devices.

Embodiments of the present invention may use terms such as, processor, computer, apparatus, system, sub-system, module, unit, device (in single or plural form) for performing the operations herein. This may be specially constructed for the desired purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, Disk-on-Key, smart cards (e.g. SIM, chip cards, etc.), magnetic-optical disks, read-only memories (ROMs), random access memories (RAMs), electrically programmable read-only memories (EPROMs), electrically erasable and programmable read only memories (EEPROMs), magnetic or optical cards, or any other type of media suitable for storing electronic instructions capable of being conveyed via a computer system bus.

The processes/devices presented herein are not inherently related to any particular electronic component or other apparatus, unless specifically stated otherwise. Various general purpose components may be used in accordance with the teachings herein, or it may prove convenient to construct a more specialized apparatus to perform the desired method. The desired structure for a variety of these systems will appear from the description below. In addition, embodiments of the present invention are not described with reference to any particular programming language. It will be appreciated that a variety of programming languages may be used to implement the teachings of the inventions as described herein.

The references cited in the background teach many principles of computerized management of related data records that are applicable to the present invention. Therefore the full contents of these publications are incorporated by reference herein where appropriate for teachings of additional or alternative details, features and/or technical background.

Reference is made to FIG. 1A schematically illustrating a block diagram of an exemplary data records management system 100 in accordance with certain embodiments of the present invention. System 100 is configured and operable for management of multiple data records aimed at merging at least one first data record to at least one second data record into one consolidated data record.

It should be understood that the data record may include a group of information pieces treated as a single logical entity. The record may comprise one or more sub-records, each sub-record comprising one or more fields or other logical sub-entities. In some cases, the data record may be a written or paper record, convertible to a form storable in a computer by performing optical character recognition, as is known in the art. A data record may be constructed from data pieces, which are stored in different databases enabling reconstruction of said data record.

More specifically, the present invention is used for management of family trees of individuals and is therefore described below with respect to this specific but not-limiting example. Thus, the first and second data records may constitute first and second family trees. A family tree may include any model for organizing one or more data repositories in a hierarchical arrangement comprising at least parent and children nodes. It should be understood that a family tree may be of different complexity, e.g. be as simple as one parent and one child, as complex as the theoretical "single family tree" that inks all data in the repositories, etc.; two or more trees may overlap, or one tree may completely include one or more other trees.

System 100 is a computer system including inter alia a processor utility 102 and a memory utility 104. System 100 may include a user interface as its constructional part and/or may be configured to be accessible by one or more user interfaces, generally at 106, at remote communication device. In the present example, system 100 is configured to be connectible to a communication network 106 (e.g. the Internet) and accordingly includes an appropriate communication utility 108, and is accessible from one or more user interfaces associated with any communication devices having input and display capabilities (e.g. personal computer, workstation, PDA, telephone, WebTV device, etc.) which are operatively linked to the system 100 through the communication network 106 (via server-client communication session). System 100 thus functions as a server utility installed in a single computer or having multiple modules distributed between multiple computers. The term "computer system" or "server utility" are used herein interchangeably. In certain embodiments of the present invention the user interface may comprise a web-browser.

It should, however, be understood that in certain embodiments of the invention the user interface may be directly associated with the computer system 100. It should also be understood that system 100 functions as a server system as it is installed with the processor utility 102 preprogrammed to provide the data records management function as described herein, and may not necessarily be the network server (e.g. Internet website). It should further be understood that such server function may not necessarily be a dedicated server computer and may comprise an appropriate functionality on an otherwise non-server computer. For example, a computer system serving as the server utility for the purpose of the present invention may at the same time also be a client computer having access to a certain database records via the communication network.

As mentioned above, the server utility 100 may be a single computer or its functionality may be distributed among several different computers. Additionally, the server utility 100 may also be associated with other server utilities running other applications related or not related to building, managing and merging family trees. In certain embodiments of the present invention the server utility 100 may be a server-based host. The server utility 100 may be connected with one or more external databases 112, either directly or through the network.

In the example of FIG. 1A, processor utility 102 may be configured as an application program interface (API) and includes a first data processor 102A (which may be one or more software or hardware modules) operable for constructing family trees on the basis of data stored in the memory 104 and/or external database(s) 112, and a second data processor 102B (which may be one or more software or hardware modules) operable for merging at least two family trees into one consolidated family tree, as will be described further below. It should be noted that in some embodiments of the invention the first data processor 102A may not be in operation during the merging procedure. For example the family trees may be previously created (e.g. by the first processor) and stored in the memory utility 104. In some other embodiments, processors 102A and 102B are parts of different server utilities, and the management system 100 includes only processor utility 102B and has access, through the network, to the database which is created and updated by processor 102A being a part of another server utility.

Figure 1B:
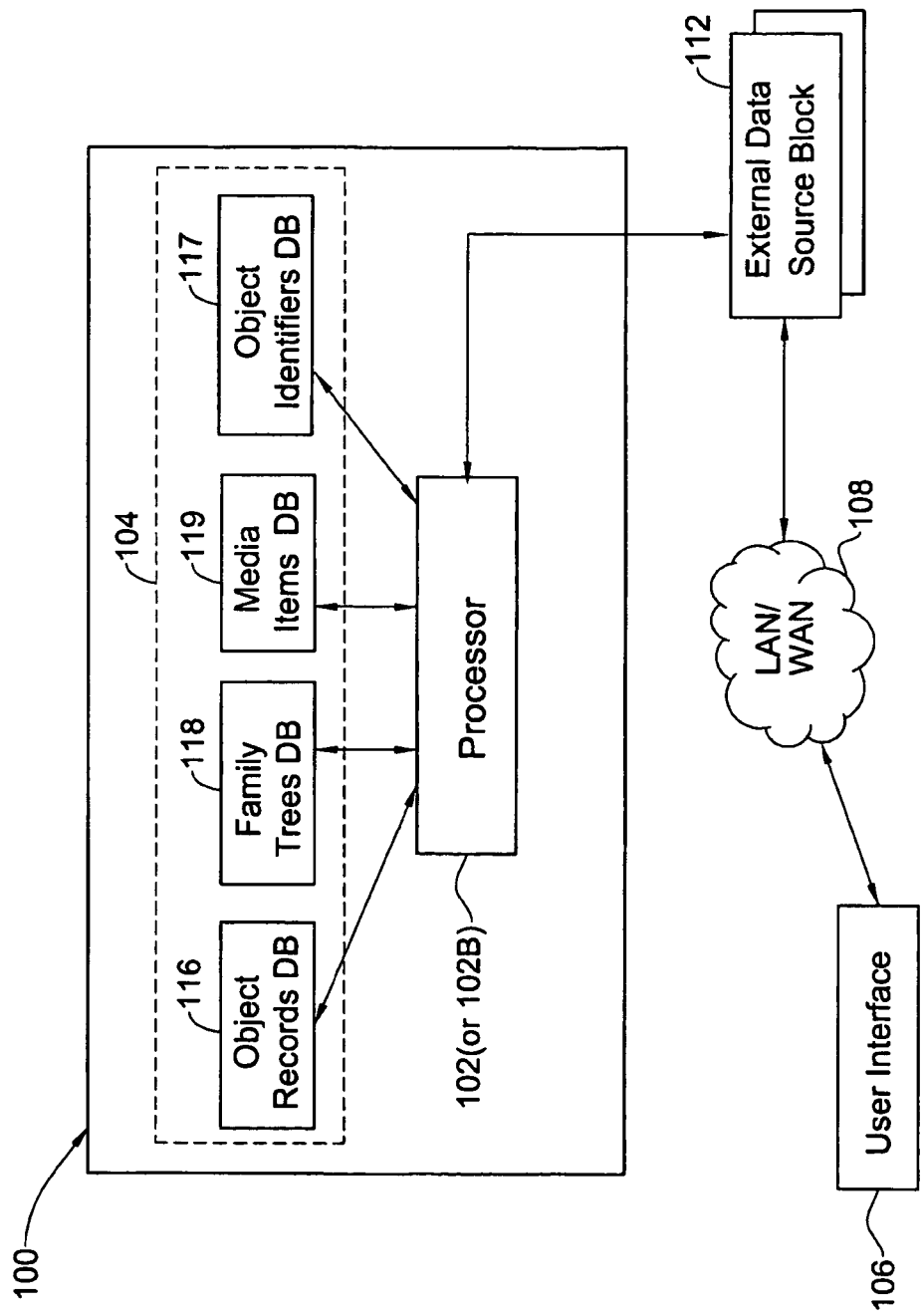
FIG. 1B illustrates an example of the database architecture in the system of FIG. 1A.

FIG. 1B exemplifies the construction of memory utility 104. As shown in this example, the processor utility 102 (including processor 102B and possibly also processor 102A being utilities of the same or different servers) is operatively coupled to one or more data repositories of the memory 104, for example, an object records database 116, an object identifiers database 117, a family trees database 118, a media items database 119, etc. The processor 102 provides necessary processing and management of data received by the computer system 100 and/or stored in the databases of the memory utility 104 and/or accessed from the external database(s) 112. The processor 102 executes calculations and data management necessary for related data records management process in accordance with the present invention. In certain embodiments, the processing functionality may be distributed between various processing components connected directly or indirectly; or/and a part of said calculations and/or data management may be executed by one or more external systems.

Considering the specific not-limiting example of the invention, where the invention is used for management of data records related to genealogy, the "object" is constituted by a person, a "data record" may for example be constituted by a "family tree" of the respective person, and the "object identifier" may be constituted by a "person identifier". It should be noted, however, that the certain aspects of the present invention are applicable in a similar manner to any other computer-based managing of related data records. The latter may include a group of data records related by common values comprised in and/or associated with one or more sub-records, said common values matching certain criterion.

In accordance with certain embodiments of the present invention a person is characterized by personal record comprising information related to the person. This information is stored in the object records database 116. The information related to the person may comprise name, date of birth, death, marriage, current and former addresses and the dates he or she lived at each address, health-related information, fingerprints and other biometric identifiers; details about relatives, friends and/or colleagues and the nature of the relationship, education related information, curriculum vita, personal preferences, photos, video clips, etc. Said information may be sub-grouped in accordance with different categories (e.g. per information aspects, sources and/or time of receiving information, data formats, per related persons, combination thereof, etc.); accordingly the personal record may comprise one or more sub-records handling the information sub-groups or parts thereof. Information in different sub-records may overlap. Information comprised in a sub-record is referred to hereinafter as a sub-record value.

In addition to the value, the sub-record and/or one or more parts thereof may be characterized by one or more attributes serving to classify the sub-record and/or parts thereof.

According to a preferred embodiment of the invention, a person is also characterized by unique identifier (person identifier) comprising a certain set of data and enabling distinguishing the person from any others with a probability matching certain criterion. This information may be stored in the object identifiers database 117.

According to some embodiments of the invention, the processor utility 102 is preprogrammed for initiating and carrying out the family trees merging procedure. Such initiation of the merging procedure may for example be performed by the processor periodically, or upon identifying certain event (e.g. update in any family tree in response to input of one or more users). Alternatively or additionally, the processor utility 102 may be preprogrammed to carry out the merging procedure, initiated by a user's request.

The merging procedure includes searching in the family trees for the at least two related family trees, namely family trees having at least one matching sequence (according to predetermined criteria); and upon identifying at least one first family tree having at least one matching sequence with at least one second family tree, merging the first and second family trees into one consolidated family tree. The predetermined criteria may include a minimal number of common nodes and respective connecting line(s) in the two family trees and possibly also weighting factors (as will be described below) of the nodes. The minimal number of common nodes might vary being for example dependent on the nodes' weighting factors.

Figure 2:
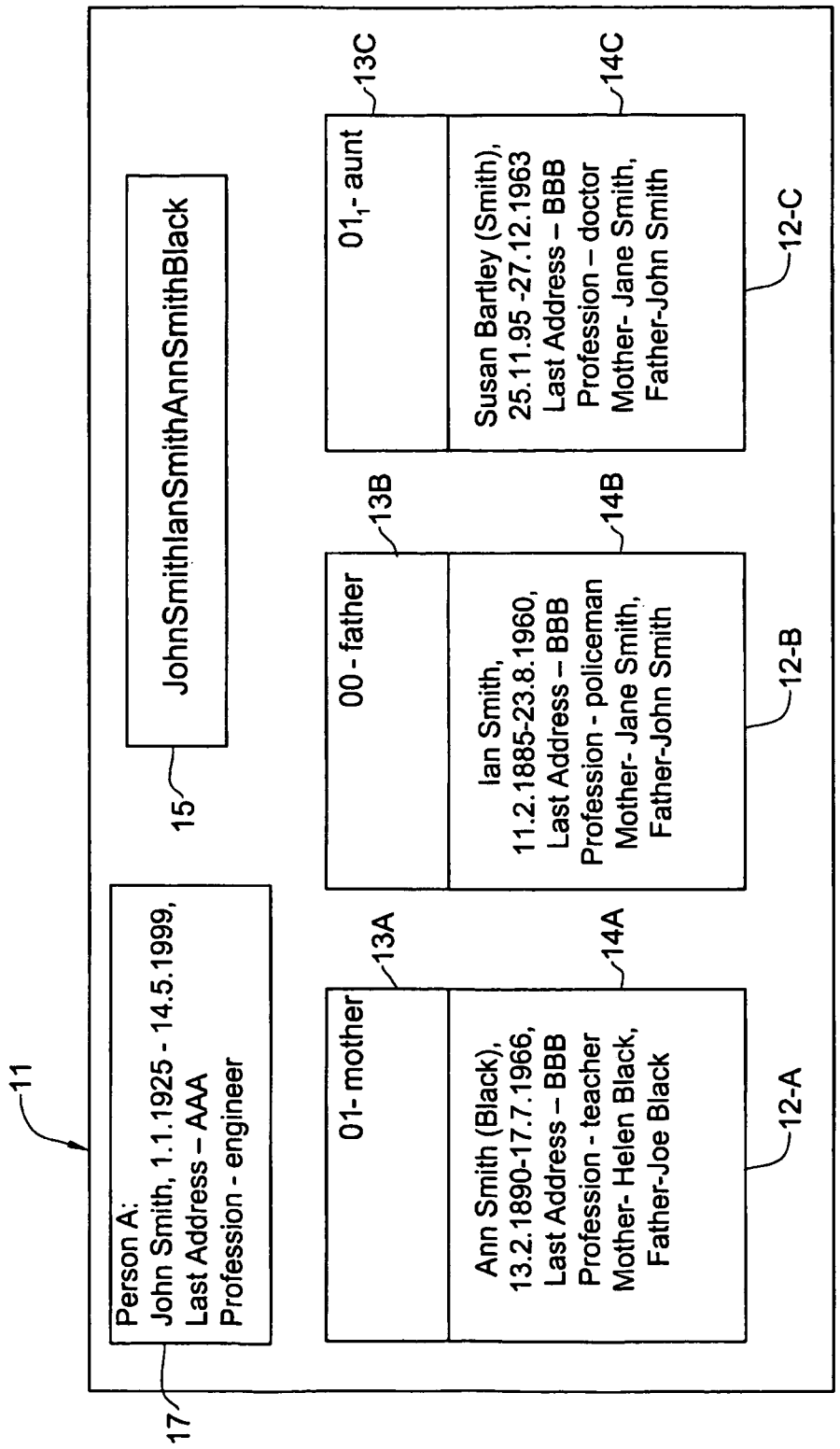
FIG. 2 illustrates an exemplified personal record and structure thereof in accordance with certain embodiments of the present invention.

Reference is made to FIG. 2 illustrating by way of non-limiting example a personal data record 11 of person A. This data record 11 presents the family tree data of person A, namely a family tree previously created for person A (based on his/her input) and stored in the family trees database (118 in FIG. 1B) or a family tree creatable for person A based on data stored in object records database (116 in FIG. 1B) and object identifiers database (117 in FIG. 1B). The personal data record 11 comprises a main record part 17 including the personal data of person A, e.g. his/her name, date of birth, last updated address, profession, etc., and comprises at least one sub-record, assigned to the relative(s) of the person A, three such sub-records 12-A, 12-B and 12C being shown in the present example. These sub-records 12-A, 12-B and 12C are characterized by sub-record values 13-A, 13-B, 13-C, respectively, and by respective attributes 14-A, 14-B, 14-C indicating relationship between the person A and the corresponding relative. This is illustrated in the figure in a self-explanatory manner. The person identifier 15 of person A (being a data piece of the data stored in object identifiers database 117 shown in FIG. 1B) is associated with the personal data record 11 and is generated based on at least part of information comprised in the personal data record 11. Information in a sub-record of the person A data record assigned to the person A relative may constitute a part or entire personal data record of said relative.

Referring back to FIGS. 1A and 1B, the information in the personal data records may be received (e.g. via communication with a user, in a pull or push mode) from the corresponding person and/or other users and/or one or more data repositories in the computer system 100 and/or one or more external data sources 112. The personal data records are stored in the object records database 116. Optionally, one or more subgroups of information related to the person and stored in certain media formats (e.g. photo, audio and/or video files, etc.) may be stored in the media items database 119 and be handled as sub-records constituting a part of the corresponding personal data record. As will be further detailed with reference to FIGS. 3-9, the processor utility 102 is configured to update the personal data records in accordance with teachings of the present invention.

As will be further detailed with reference to FIG. 9, the processor utility 102 is configured to generate, update and/or compare the person identifiers in accordance with data received from a corresponding person and/or other users and/or data comprised in one or more data repositories in the computer system 100 and/or one or more external data sources 112. The person identifiers are stored in the object identifiers database 116. As will be further described with reference to FIG. 9, in certain embodiments of the invention the person identifier comprises at least subset of information (and/or derivatives thereof) comprised in the corresponding personal data record. Nevertheless, a part of information (and/or derivatives thereof) comprised in the person identifier (e.g. information related to trustworthiness of the person identifier) may be absent in the corresponding personal data record. In certain embodiments of the invention the person identifier and/or derivatives thereof constitute a part of the corresponding personal data record.

The computer system 100 is also capable of generating and/or presenting to a user (e.g. via user's interface) a family tree related to one or more persons as will be further described with reference to FIGS. 3-9. One or more family trees may be generated for a period of the user's login to the system and/or may be stored and maintained in the computer system 100 (e.g. in the family trees database 118), in a device associated with the user's interface, external data base, etc.

The data repositories may be updated in different modes, for example, based on data received from different sources (e.g. users, one or more other data repositories, external sources, etc.) in push mode and/or pull mode (e.g. per user's request, per request generated by the processor utility 102, per predefined event), etc. The input of data in the databases may be manual (e.g. by the person or another users), combined (e.g. including user's authorization for input of pushed data) or fully automated (e.g. from external sources).

One or more data repositories may comprise criteria, conditions, algorithms and/or programs related to the management of related data records in accordance with certain embodiments of the present invention.

Those skilled in the art will readily appreciate that the invention is not bound by the configuration of FIGS. 1A-1B; equivalent functionality may be consolidated or divided in another manner. In different embodiments of the invention the blocks and/or parts thereof may be placed in multiple geographical locations; operative connections between the blocks and within the blocks may be implemented directly or indirectly, including remote connection. The connection may be provided via Wire-line, Wireless, cable, Internet, Intranet, power, satellite or other networks and/or using any communication standard, system and/or protocol and variants or evolution thereof.

Those skilled in the art will also readily appreciate that the databases comprising information related to the persons, derivatives thereof and/or other information related to the system operation may be consolidated or divided in other manner, some of these databases may be external to the computer system 100 and/or may be managed by 3rd parties.

Figure 3:
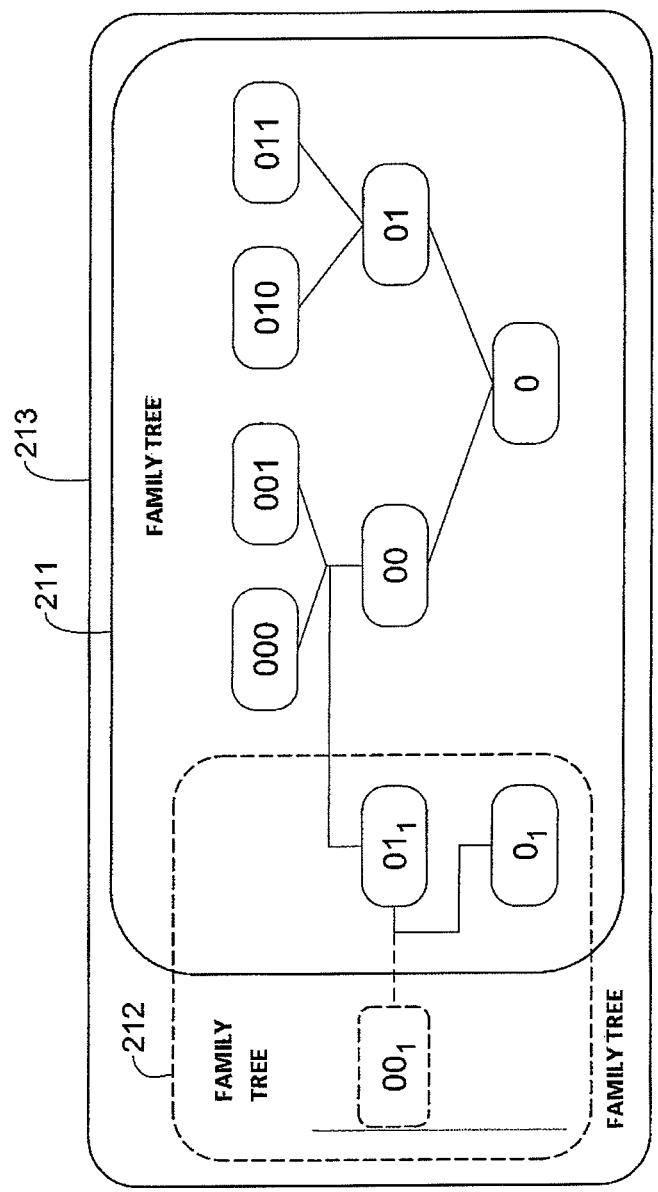
FIG. 3 illustrates an exemplified schematic family tree generated in accordance with certain embodiments of the present invention.

Referring to FIG. 3, there are exemplified simplified family trees generated in accordance with certain embodiments of the present invention. Three family trees 211, 212 and 213 are shown, in which persons (or family tree members) are represented by nodes in a manner known in the art. Relationships between the nodes correspond to real life relationship between persons represented by the nodes.

For example, the family tree 211 represents the personal data record of person A, an individual born in the latest (first) generation and represented in the tree by the bottom-most node 0. The person A has a father and a mother represented by nodes 00 and 01, respectively. The father 00 and the mother 01 are in the second generation working backwards from the first generation. The tree 211 also includes such nodes as the father's father 000, the father's mother 001, the mother's father 010, and the mother's mother 011 who represent the third generation in the tree. The illustrated tree may be extended further back for any number of generations. Also, the tree 211 includes father's sister $01_1$ and her daughter $0_1$ being a cousin B of the person A. The family tree 212 represents the personal data record of person B, an individual born in the latest (first) generation and represented in the tree by the bottom-most node $0_1$. The person B has a father and a mother represented by nodes $00_1$ and $01_1$, respectively, where the person B mother $01_1$ is the sister of the person A father.

Thus, the family trees 211 and 212 represent relationships between one or more persons having related personal records, said relationships being characterized by attributes of sub-records in the corresponding personal records. Each node of the family tree bears information including at least subset of information (and/or derivatives thereof) comprised in the corresponding sub-record assigned to the corresponding represented person.

Different family trees may comprise nodes representing the same person. Nodes in different trees corresponding to the same persons (e.g. persons with matching person identifiers) are considered as common nodes, and the trees comprising such common nodes are considered as related.

For example, the nodes $01_1$ and $0_1$ constitute family tree 212 of person B while comprising also other node(s) relating to person A, i.e. node $00_1$ corresponding to father of the person B cousin. The tree 212 thus has common nodes $01_1$ and $0_1$ with the tree 211, and accordingly, the trees 211 and 212 may be considered as related trees, or trees having at least one matching sequence according to predetermined criteria. In this specific example, the matching condition (criteria) is the existence of a sequence formed of at least two common nodes and a connecting line between them. The tree 213 represents a result of fully merging the trees 211 and 212. Thus, the related personal data records may be updated by consolidating one or more sub-records and information thereof; accordingly, the related family trees may be fully or partly merged to generate one or more new trees representing the updated records.

Thus, in accordance with certain embodiments of the present invention described with reference to FIGS. 2 and 3, a person is characterized by a personal record and a person identifier. Information in the personal record may be grouped, for example, in subgroups related to the relatives of the person. Accordingly, the personal record may comprise sub-records assigned to the relatives represented by the appropriate nodes of the family tree.

Figure 4:
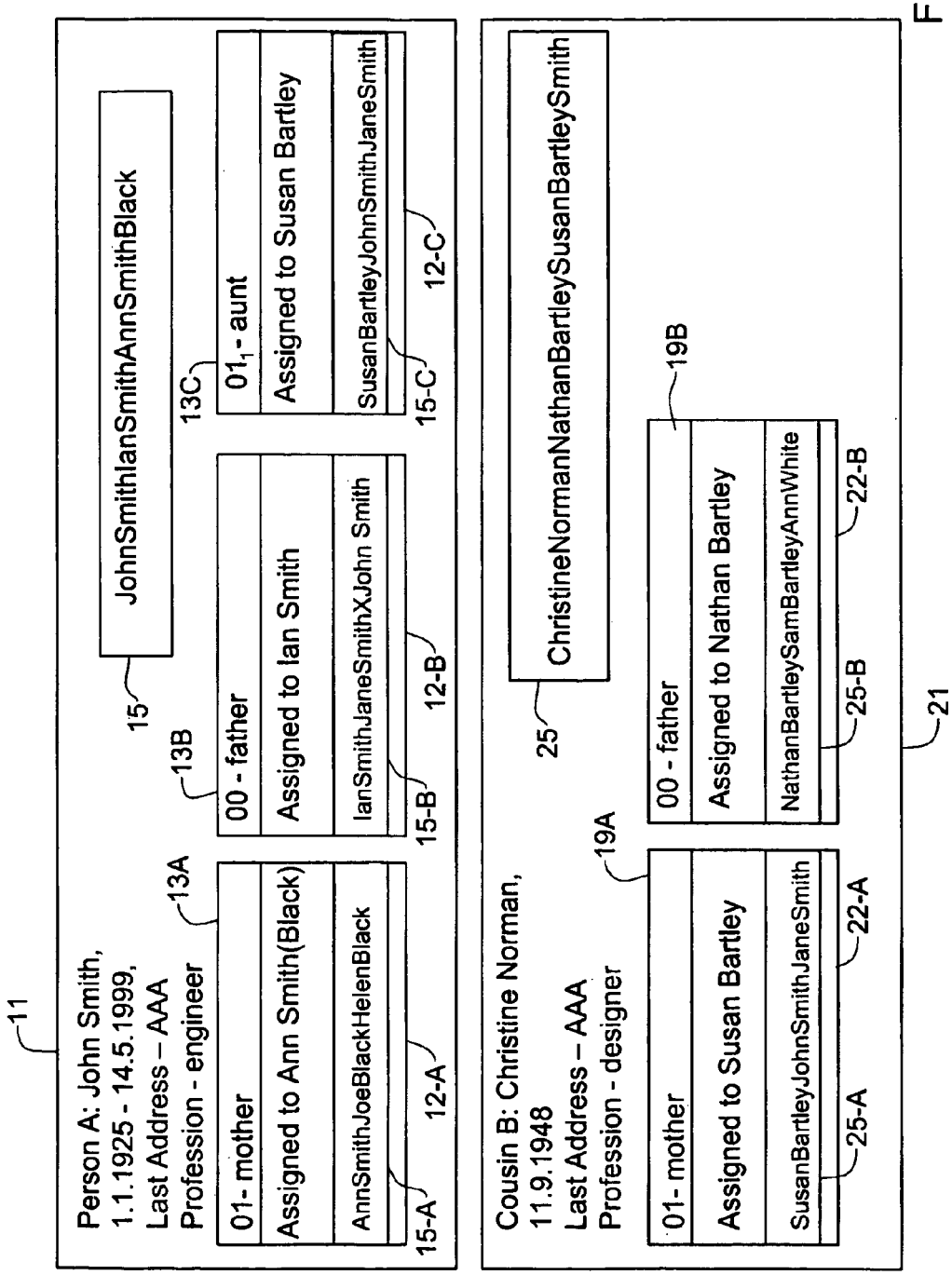
FIG. 4 illustrates exemplified common personal records in accordance with certain embodiments of the present invention.

As illustrated by way of non-limiting example in FIG. 4, the personal record 11 of the person A comprises sub-records 12-A, 12-B, 12-C and other (not shown) assigned to other persons represented in the family tree 211. Said persons represented by the nodes in the tree are characterized by their own personal records comprising sub-records assigned to the family members as, for example, personal record 21 of cousin B comprising sub-records 22-A, 22-B and other (not shown). The personal record of cousin B is characterized by person identifier 25, as well as each sub-record in the personal records 11 and 21 corresponding to assigned family member is characterized by corresponding person identifiers 15-A, 15-B, 15-C, 25-A, 25-B accordingly.

In accordance with certain embodiments of the present invention, two personal data records or family trees are considered as related records or mergeable family trees, if they comprise at least two common sub-records, namely sub-records assigned to the same persons, which are identified by match in the person identifiers. Three or more personal data records are considered as related records if each pair of records among said three or more records comprises common sub-records. Common sub-records may be characterized by different attributes classifying relationship between persons.

For example as illustrated in FIG. 4, the personal record 11 of the person A and the personal record 21 of the cousin B are related as having common sub-records 15-C and 25-A accordingly, assigned to the same person. However said common sub-records have different attributes indicating mother-child relationship in one record and aunt-nephew relationship in the other record.

The attributes may characterize relationships between first degree family members (parents, brothers and sisters, spouse, children) as well as further (second, third, etc.) degree family members (grandparents, cousins, in-laws, etc.). The family members included in the relationship data may be living or dead, the relationship may be past or present, etc. In certain embodiments of the present invention the attributes may characterize other types of relationships including, for example, friends, acquaintances, neighbors, business colleagues or associates, members of societies or organizations to which the individual belongs, and others.

The sub-records' values 13A, 13B and 13C in the data record of person A, as well as sub-records' values 19A and 19B in the data record of person B, actually present weighting factors of the respective nodes. It should be noted that common sub-records in the family trees' data records do not necessarily have the same value. For example, sub-record 15-C assigned to aunt $01_1$ in the personal record 11 of the person A may be less detailed than the corresponding common sub-record 25-A in the personal record 21 of the cousin B assigned to her mother 01 (aunt $01_1$ of the person A). Sometimes, common sub-records, although being assigned to the same persons (i.e., with matching person identifiers), may comprise non-identical and at times even contradictory information. For example: data on a related individual may include attributes incorrectly entered, e.g. incorrect birth date, address, etc; name of an individual included in a sub-record may be differently inputted by different individuals, e.g. "Michael" may be inputted as such by one and as "Mike", "Mich", or "Micha" by another or the name "Jonathan" may also be "John", "Johnny", etc.; there may be mismatches as results of uses of different languages for data entry by different individuals; and so forth.

Figure 5A:
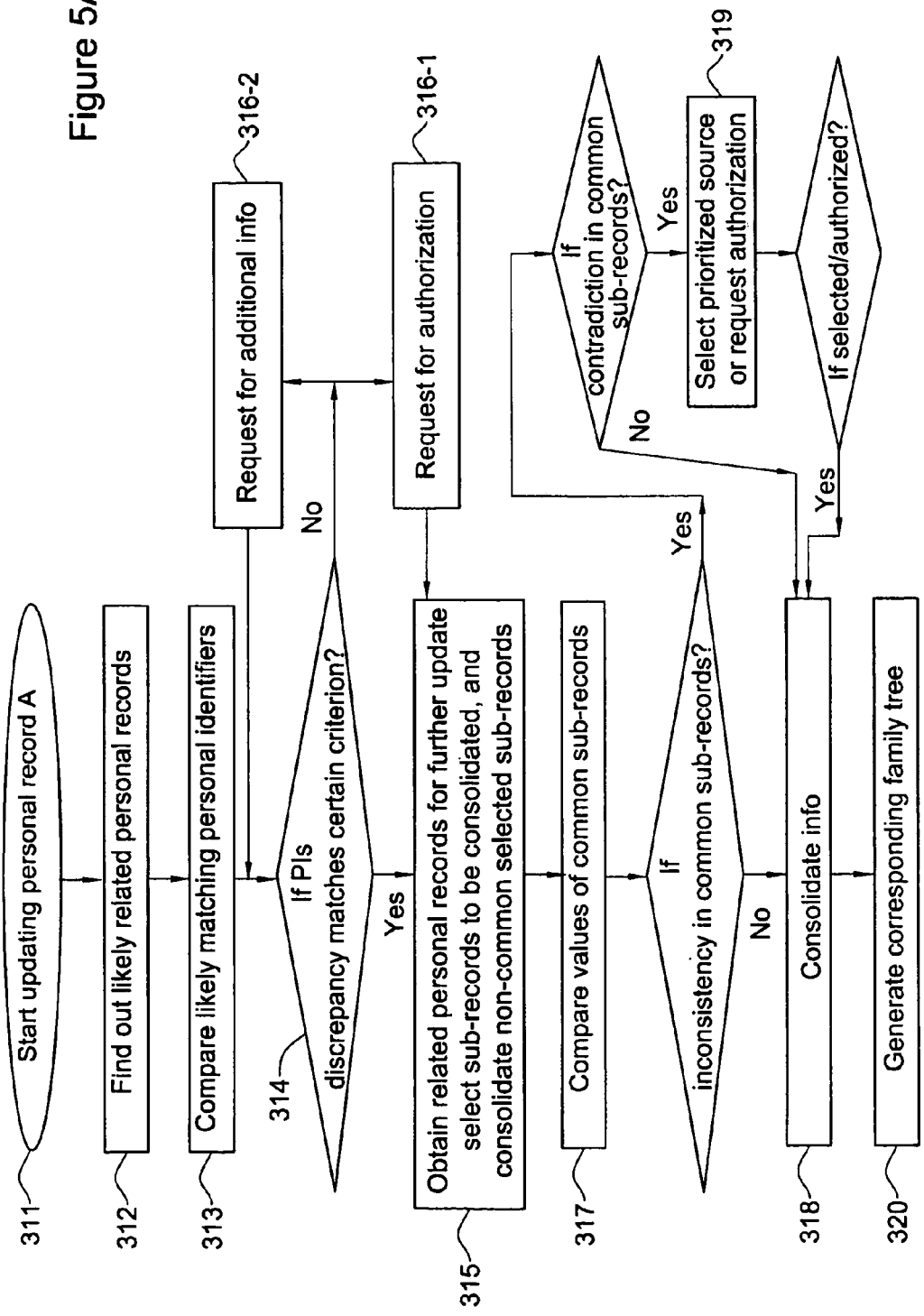
FIG. 5A illustrates a flow diagram of an example of a method of the present invention for managing personal records.

Referring to FIG. 5A, there is illustrated a flow diagram of an example of a method of the present invention for managing multiple data records (family trees) for merging two or more of them. As described above, corresponding person and/or other users may enter information for creating and updating one or more personal data records. The personal record may be also updated by the management system (100 in FIGS. 1A and 1B). The process of merging the family trees may be initiated by a user, or by the management system. In some embodiments, the system starts this process periodically, and upon detecting mergeable tree(s) or upon performing a merge, indicates the same to the user, allowing him/her to display the results.

Thus, in the present not limiting example, the system starts updating the family tree of person A (step 311), based on information stored within the memory utility of the system (e.g. other personal records) or in one or more external databases. Such update may be initiated per request of the user, per predefined time schedule, per predefined event, combination thereof, etc. For example, the management system may be configured to initiate an updating of the personal record A. This may be done periodically, e.g. every month, and/or when a certain condition is satisfied, e.g. when total number of sub-records assigned to relatives achieves some predefined threshold, and/or after receiving new and/or certain type of information from the user, etc.

After starting the update, the computer (its processor utility) searches for personal records likely to be related to the personal record A to be updated (step 312). In certain embodiments of the invention the sub-records assigned to certain persons comprise corresponding person identifiers, derivatives or links thereof; accordingly, the likely related personal records may be found by looking for pairs of likely matching person identifiers comprised in (or corresponding to) sub-records of different personal records.

After pairs of likely matching person identifiers have been found, the computer system operates to compare the person identifiers or derivatives thereof (step 313), so as to find discrepancy (any compound discrepancy, including, for example, several discrepancies and/or their combination) among likely related person identifiers, and to determine whether the discrepancy matches certain criterion (step 314).

If the discrepancy matches certain criterion (e.g. likelihood that the person identifiers characterize the same person is higher than certain probability, for example predefined in the management system (e.g. 80%), and/or set by the person or other user, and/or average probability for related records, etc.), the computer system operates to obtain related personal records, i.e. personal records having common sub-records, and to select among the obtained personal records those records which are to be used for further update and/or sub-records to be consolidated with the personal record A (step 315). If the discrepancy does not match the criterion, the computer system may deny the record as non-related, or may request the user to authorize that two sub-records are assigned to the same person (step 316-1). In certain embodiments of the invention the computer may request the user or one or more external sources for additional information (optional step 316-2), update person identifier(s) accordingly and repeat the comparing operation (step 313).

Comparing the person identifiers may be provided in several ways, some of which are known in the art. Certain embodiments of comparing person identifiers in accordance with present invention are further detailed with reference to FIG. 9. The related personal records to be used for further update of the personal record A may be selected in accordance with configurable or predefined criterion, e.g. all related records, related records having common sub-records characterized by certain attributes (e.g. certain generation, certain genealogical line, etc.), related records with predefined number of common sub-records, etc. The sub-records among the selected related personal records may also be selected to be used for the further consolidation in accordance with configurable or predefined criteria, e.g. only sub-records being common or being non-common with sub-records in the personal record to be updated sub-records characterized by certain attribute, sub-records comprising certain fields (e.g. address at certain period of time, profession, education, etc.) and/or other criteria.

One or more sub-records among the sub-records selected for consolidation may be common (while not necessary common with sub-records in the personal record A), i.e. to be assigned to the same person. Said sub-records selected for consolidation may have different values (i.e. contain different information or have different weighting factors); information comprised in one record may complement or contradict information in the other(s) as described above. The computer system operates to compare values of said common sub-records (step 317).

If there is no inconsistency between sub-records or there is no contradiction between inconsistent information, the information comprised in the common sub-records is combined. If information in one common sub-record contradicts information in the other(s), the computer system may select information from one of the sub-records in accordance with predefined selection criterion, deny using the contradicting sub-records for update of record A, ask the user to select the proper sub-record or to re-configure selection criterion, etc. (step 319). The selection criterion may be related to the time of sub-record updating, source of information comprised in the sub-record, etc. For example, the trustworthiness of sub-record may be ranked in accordance with its attribute characterizing relationship between the person assigned to the sub-record and the person characterized by the record (e.g. the sub-record 22-A in FIG. 4 may be ranked as more trusted than the sub-record 12-C).

The computer system then operates for consolidating the sub-records selected for further update with the personal record A (step 318), thus generating the updated personal record A (step 320). Said consolidation may include combining information comprised in the common sub-records.

As sub-records and/or parts thereof may have different attributes reflecting different relationships of the same persons in different personal records, the consolidation may also include reassignment of attributes characterizing sub-records and/or parts thereof. Such reassignment may be provided, by way of non-limiting example, in accordance with lookup table associating initial and reassigned attributes in accordance with relationship between the person characterized by the personal record to be updated (person A), the person characterized by the related record comprising appropriate sub-record and/or the person to whom said sub-record is assigned.

The family tree representing the updated personal record may be generated (step 320) automatically or per user's request.

It is to be understood that the described operations may be provided on any or all of the records and the information thereof, and may use methods known to those skilled in the art or methods that are apparent in light of this disclosure.

Those skilled in the art will readily appreciate that the operations described with reference to FIG. 5A may be implemented in a similar manner on a level of personal records presentation (e.g. family trees). Accordingly, the nodes comprised in two or more family trees may be directly or indirectly associated with corresponding person identifiers in a manner that for each of said nodes corresponding person identifier characterizes the person represented by the node. At least one of the related family trees, i.e. family trees comprising nodes associated with person identifiers characterizing the same person, may be updated by consolidating (merging) the nodes comprised in said family tree with nodes selected among nodes comprised in the other related family trees.

Figure 5B:
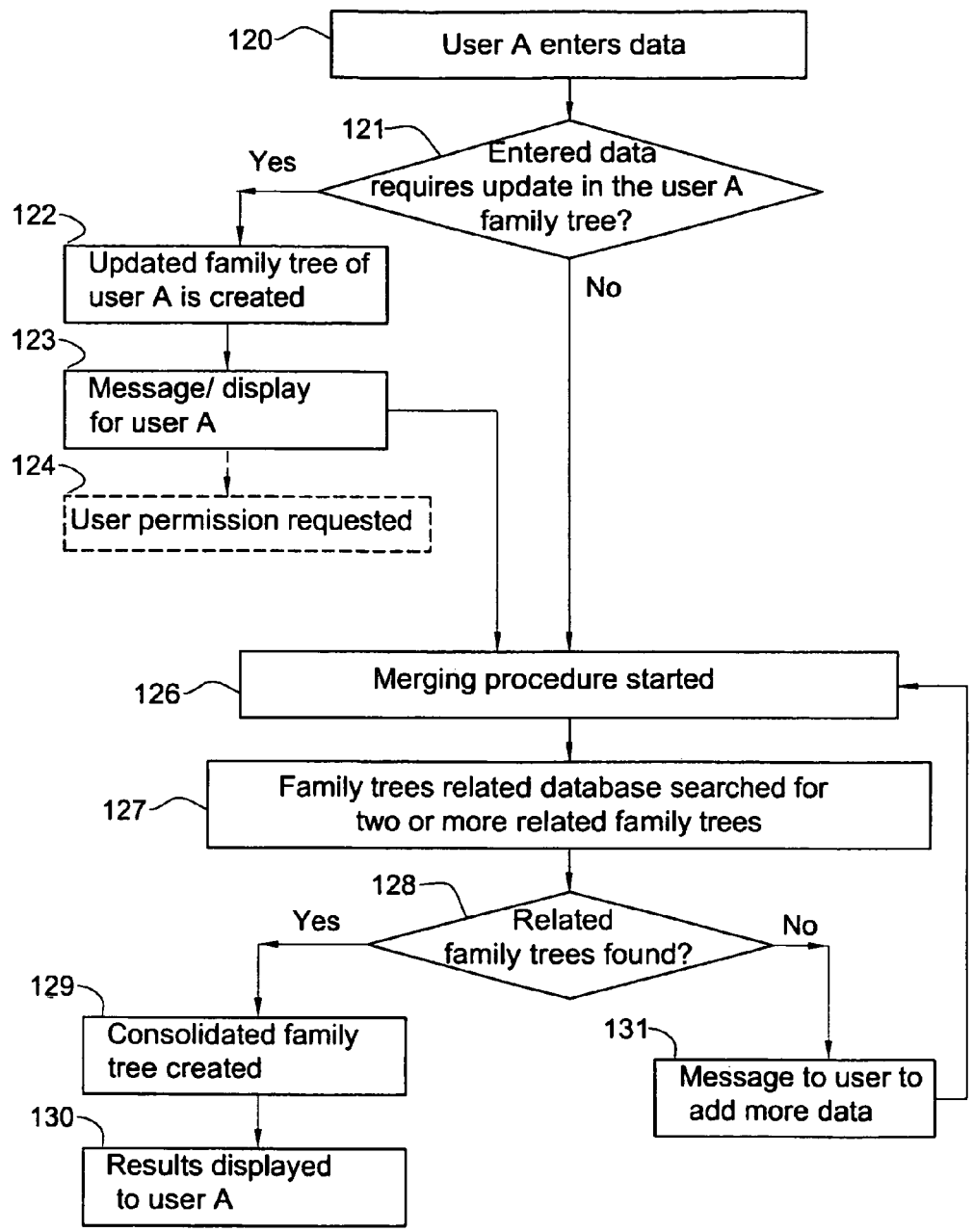
FIG. 5B illustrates another example of a method of the present invention for management of family trees aimed at merging related two or more family trees.

FIG. 5B illustrates another flow diagram pertaining to an example of a method of the present invention for managing users family trees related data. In this example, the management system is preprogrammed for operating with a certain mode (per user's selection) where the merging procedure is initiated by the system upon detecting a data update from said user, in particular update relating to the entry of new nodes to the family tree (and hence filling of additional sub-records).

Thus, user A enters certain data relating to his personal data record (step 120). The processor utility (102 in FIGS. 1A and 1B) identifies this data entry and operates to check whether the entered data requires update in the user A family tree (step 121).

If the data entry requires update in the family tree, the processor utility operates to create the user A updated family tree (step 122). The system may for example operate to display the updated family tree to the user A or confirm to the user that the family tree has been updated (optional step 123), and if the added data gives rise to the possibility of merging the family tree of user A with another family tree, a merging process may be initiated (step 126). The merging may occur automatically or may be user-initiated, e.g. in response to a prompt by the system which may, for example request the user A permission to attend to a merging procedure (optional step 124). It is also an option that the merger procedure occurs virtually, regardless of user A permission, and will manifest itself in user A's family tree only if so initiated by user A.

Thus, if the family tree is updated and/or user A instructs the system to attend to the merging procedure, the processor utility starts the merging procedure (step 126). To this end, the processor utility operates to search in the family trees related database (step 127) to identify another one or more related family trees in accordance with a predefined condition (e.g. trees having at least one matching sequence including a predefined minimal number of common nodes and connecting line(s))—step 128.

If the predefined condition allows finding at least two related trees satisfying this condition, consolidated family tree is created (step 129) and data indicative thereof is generated for the user (step 130), e.g. the consolidated family tree is displayed to the user.

If the predefined condition (e.g. the existence of at least a defined number of common nodes and/or a certain weighting factors in the two family trees) does not allow finding related family trees, the system may generates a corresponding message to the user (step 131), for example prompting the user to add more data required for the merge.

Figure 5C:
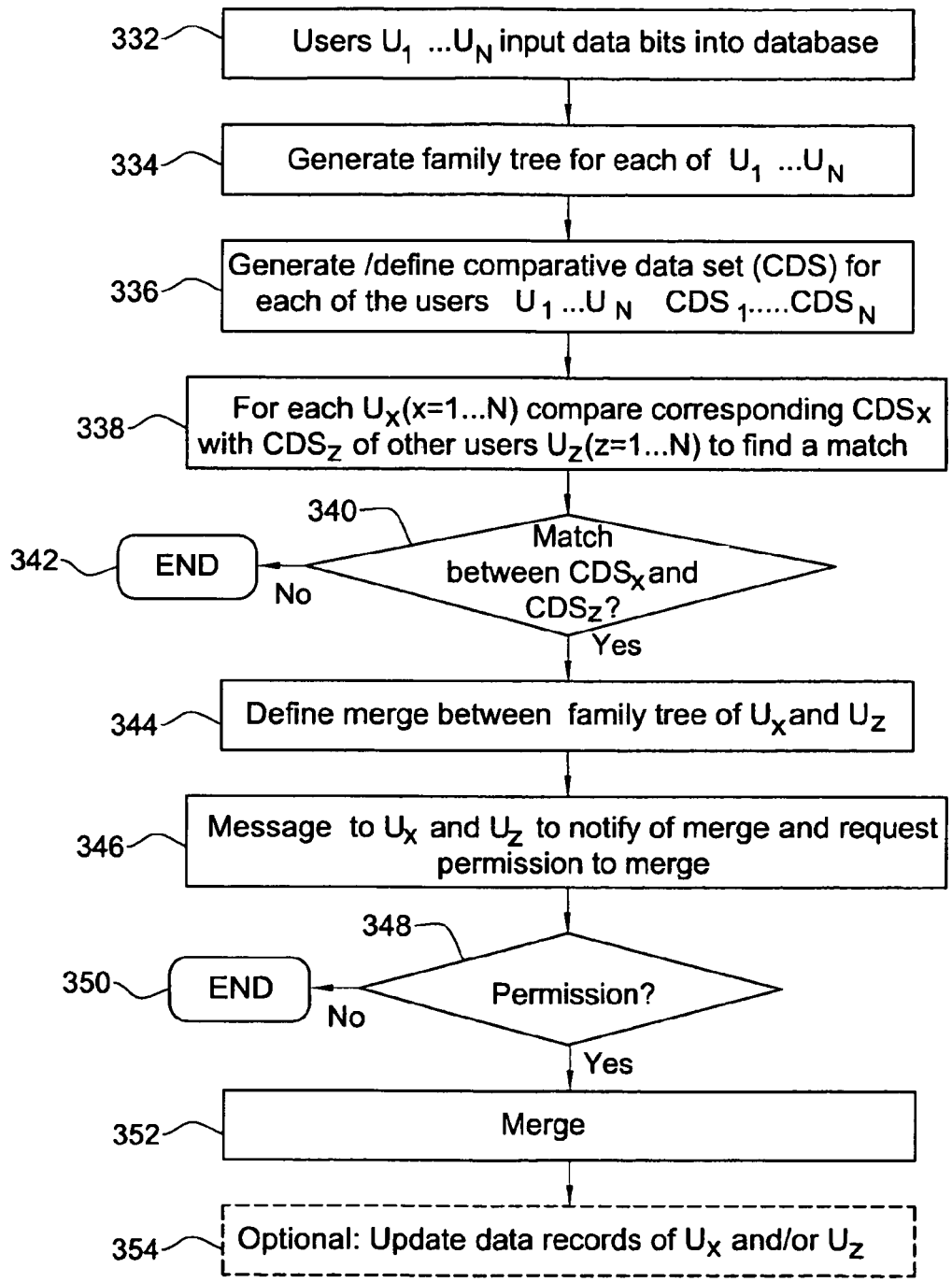
FIG. 5C illustrates yet another example of method for managing personal records according to the present invention.

Reference is made now to FIG. 5C displaying a flow chart of yet another example of merging and consolidating of family trees inputted by different users. In a first step 332, each of a plurality of users ($U_1 \ldots U_N$) inputs data into a database, including the main personal records and sub-records as defined above (the sub-records including data on related individuals). The system then generates a family tree (step 334) for each of users $U_1 \ldots U_N$. As will be appreciate, this generation of a family tree is an ongoing process and the family tree gradually grows as more data on related individuals is added. While the family tree is being built, comparative data sets $CDS_1 \ldots CDS_N$ (generally CDS) is generated or defined for users $U_1 \ldots U_N$, respectively (step 336). It should be appreciated that while step 336 is shown herein as being in sequence after step 334 these two steps may also proceed in parallel. Additionally, similarly to the generation of respective family trees for each of users $U_1 \ldots U_N$, also $CDS_1 \ldots CDS_N$ may be gradually generated as more data is entered by the users. It should also be appreciated that the data entry of different individuals is not all at once and may occur over an extended time period. It is to be noted further that the procedure of steps 334 and 336 (whether conducted in parallel or in sequence) is ongoing as long as data is inputted by users in step 332. Accordingly, as will readily be understood, the process of comparing, matching, merging and updating as described further below may be resumed when more data is inputted or periodically. Typically, although not exclusively, the process as described below may be carried out on each newly added data relating to a user or whenever the user updates the data.

For each user $U_X$ the corresponding $CDS_X$ is compared with the CDSs of other users ($CDS_Z$) to find a match (step 338). For a match to occur there needs to be a predefined minimal number of matching identifiers between the two CDSs that jointly define a match with a high probability. Some matching strategies will be exemplified below. Also, different identifiers may be given different weights and may accordingly be assigned with a weighting factor. Such weighting factors may also be factored-in to determine a match (step 340). If a match is determined, the process proceeds to define a merge between the family trees of users $U_X$ and $U_Z$ (step 344); if not, the process ends (step 342), possibly temporarily until more data will be added by user $U_X$. User $U_X$ may receive a message by the system, typically automatically generated, suggesting him to add more data, particularly data on related individuals.

Thus, once a match is identified a merge is defined between family tree of $U_X$ and another $U_Z$ (step 344). The merge may occur automatically within the system. Users $U_X$ and $U_Z$ may also each receive a message (step 346) advising them that a match has been detected and requesting permission to do the merge. The system then verifies that both users gave their permission (step 348). If in the affirmative, the process proceeds to do the merge (step 352) and the merged tree may then be graphically displayed to both users, may be presented in a tabular or data form, may be forwarded to one or both users as an electronic file (e.g. by email), each user may receive a printed copy of the merged tree, etc. If no permission is given, the process ends at 350. In case of no permission the system may be programmed to periodically request permission for the merge. In accordance with some embodiments of the invention permission of both $U_X$ and $U_Z$ is required for a merge to occur; in accordance with other embodiments permission of one of the users may be sufficient, e.g. the non-permitting user may still have available to him only his entered data.

Upon merger, the data in the two family trees may optionally be consolidated by mutual update of the data fields in both family trees (step 354), the data of family tree of the two users being independently stored as two separate, albeit identical, data records, e.g. in different data repositories, or the data may be consolidated into one consolidated data record, accessible by both users.

It should be understood that the methods of the current invention are not limited to or by the steps in FIG. 5A-5C. In some cases, a method combining the characterizing features of these methods is used, in other cases slight variations on one or more of these flowcharts are applied. For example, in some cases steps 318-320 of the method of FIG. 5A and step 352 of the method of FIG. 5C are identical.

The data stored in the computer system may be used to form family trees, tables and organizational charts, as is explained in more detail hereinbelow.

Figure 6:
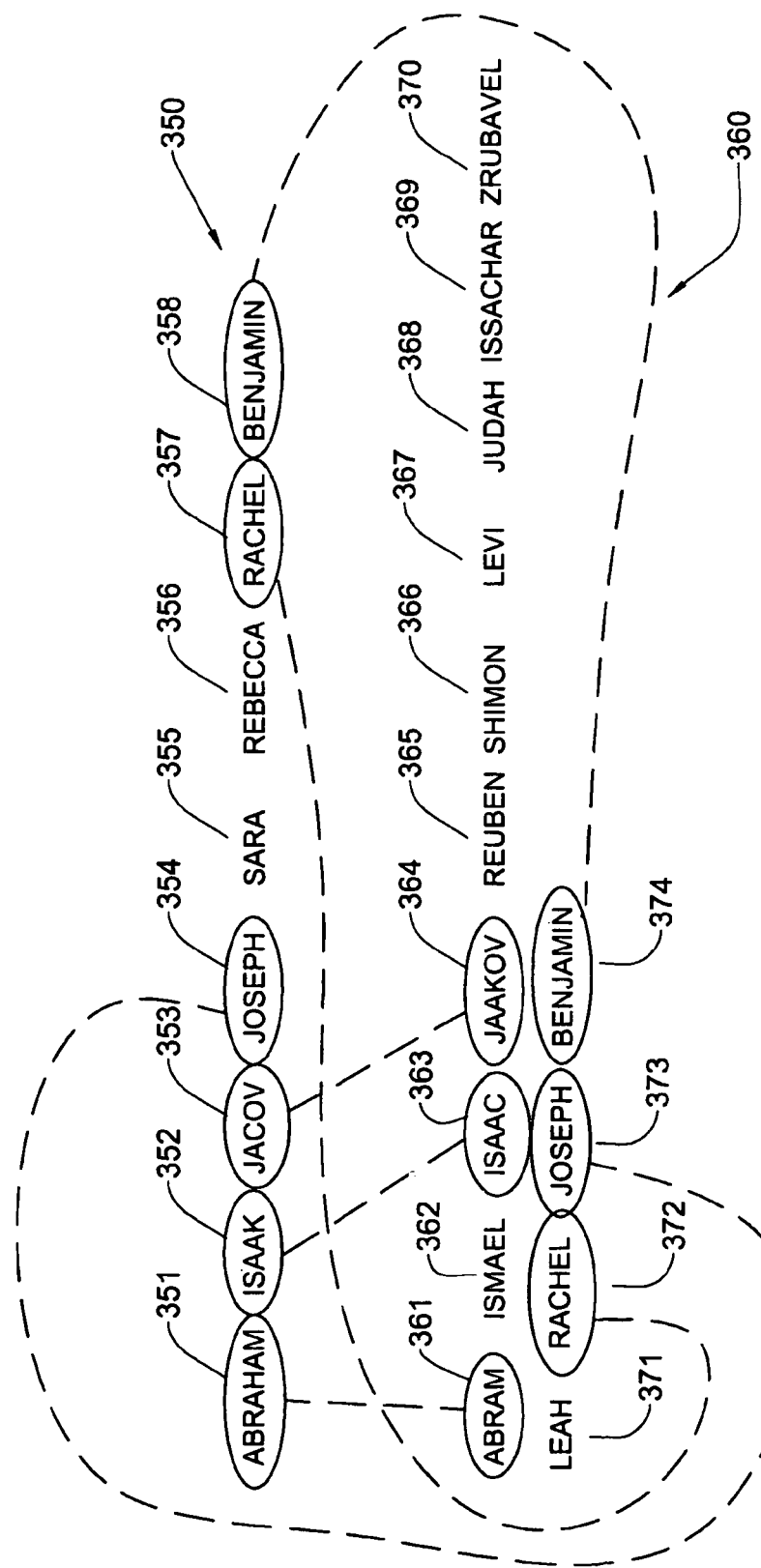
FIGS. 6 and 7 illustrate two more examples of a method of matching two different family trees.

Reference is made to FIG. 6 illustrating an example of a method of the present invention for matching a number of comparative data sets (CDSs) in two different personal data records. In this example, the personal identifiers are constituted by names that are organized in a sequential manner.

It can be seen in FIG. 6, that two strings 350, 360 of personal identifiers have six similar records (ABRAHAM 351:ABRAM 371; ISAAK 352:ISAAC 363; JACOB 353, YAAKOV 364; JOSEPH 354, JOSEPH 373; RACHEL 357, RACHEL 372, BENJAMIN, 358, BENJAMIN 374). The management system has an appropriate processing utility applying a phonetic algorithm to the similar names (the similarity being identified according to a certain criterion), ABRAHAM 351:ABRAM 371; ISAAK 352:ISAAC 363; JACOB 353, YAAKOV 364, to determine whether there are, in fact, three matching identities. The outcome, in this case, is positive and thus there are six matched data bits or personal identifiers.

Names, typically first and/or second names or a combination of a first and/or second names and family name, are one preferred personal attribute included in the CDS that is used for the purpose of searching for a match. However, other attributes such a profession, age, hobby, body-related attributes (eye or hair color, height, complexion, etc.), and so forth may also be used.

Figure 7:
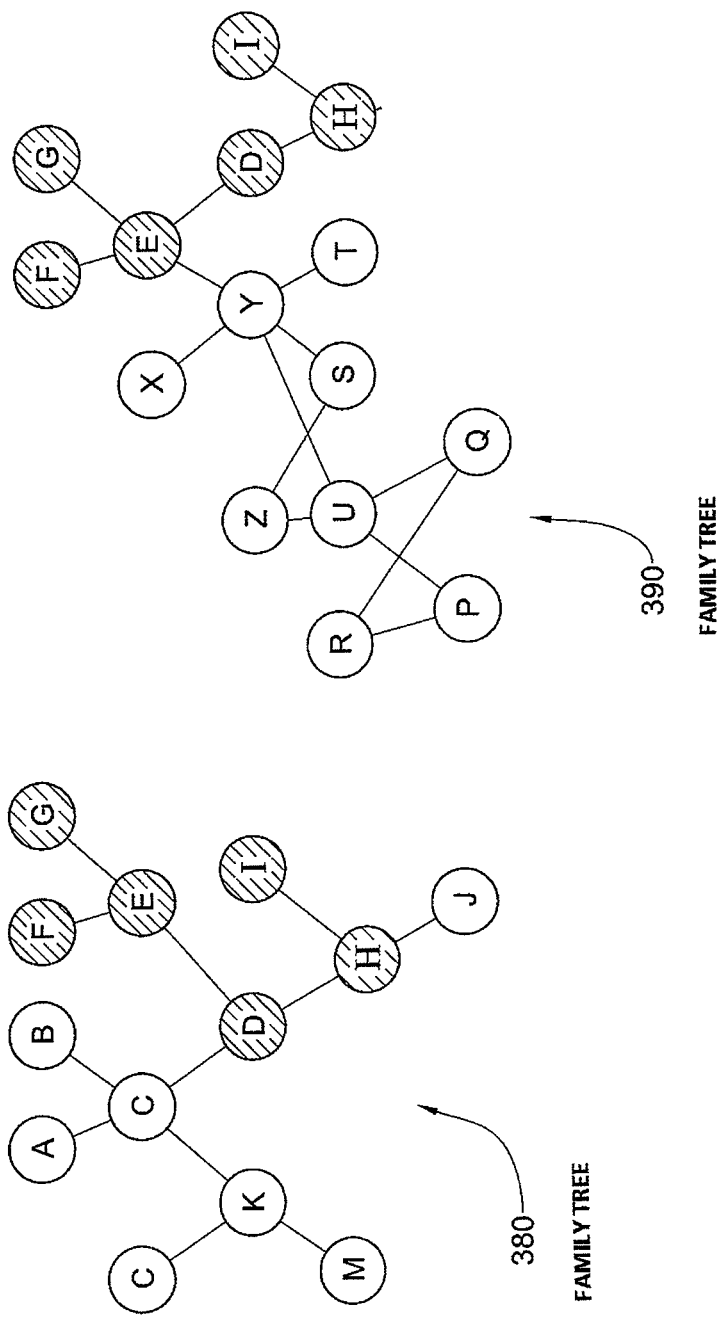

In another embodiment, two family trees may be compared by studying their topology. FIG. 7 illustrates an example of match in two different family trees 380, 390. Each family tree is represented by multiple nodes and connecting lines between them, each node corresponding to a family tree member, and the connecting line between two nodes corresponding to a relationship between the respective family members. There may be, in some cases, no data relating to the individuals of the family tree beyond their names, thus each node being represented by an individual's name. In other instances attributes other than the name may be represented by the node. The management system compares family tree 380 with family tree 390. As shown, six matching (common) nodes D, E, F, G, H, I and connections between them are found in the two family trees. This condition may be sufficient (according to predefined criteria) to merge the two family trees 380, 390 together. If affirmative, the management system operates to merge the family trees together (step 340 in the example of FIG. 5C, or steps 318, 320 in the example of FIG. 5A).

It should be understood that a condition for merging between the family trees or generally data records may be predefined by a minimal number of common nodes and their associated connection lines. The minimal number of common nodes and connections may be 2, 3, 4, 5, 6, 7, 8, 9, 10, 11, 12, 13, 14 or 15. The minimal number may vary in accordance with a system-defined permitted degree of uncertainty; culture and society-related demographic factors, such as the overall name variety or the practice of using (or not using) the same names repetitively within a family; and others. The merging algorithm may also take a weighting factor of different attributes into consideration.

Reference is now being made to FIG. 5A, illustrating an exemplary graphical representation of a merged family tree. The merged family tree is a merging product of two independently constructed family trees by two users, designated in FIG. 8A (and in FIGS. 8B, 8C and 8E) as $U_A$ and $U_B$, both being circled in the family tree for emphasis. The bounds of the two separately constructed family trees are presented by two broken lines: the family tree constructed by $U_A$ are left of the broken line marked "$U_A$"; the family tree constructed by $U_B$ is right of the broken line marked "$U_B$".

Figure 8A:
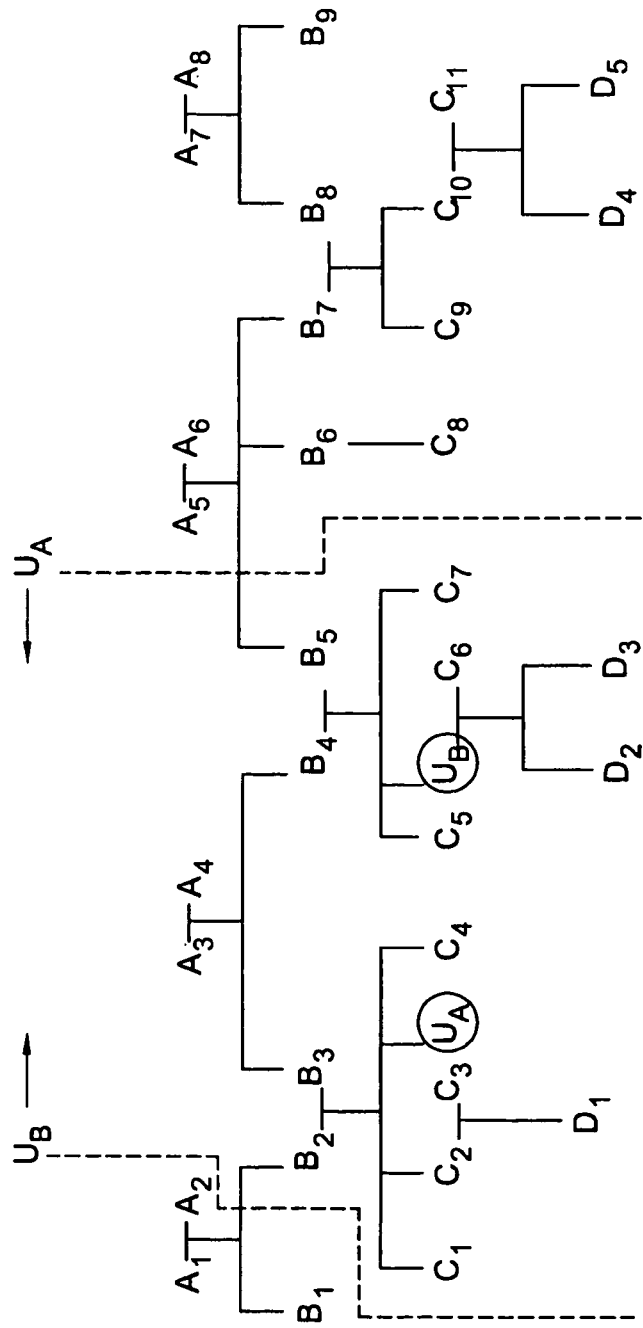
FIG. 8A illustrates an exemplary family tree merged from two independently constructed family trees, one constructed by a user $U_A$ and the other by a user $U_B$.

In FIG. 8A, each individual is a node in the family tree and is represented by a letter and index numeral. The letters and indices numerals are arbitrary and have no special significance (other than successive generations are indicated with progressing letters—from A to D; the index numeral are simply serial numbers from left to right for members of each generation). Two individuals related by marriage are connected by horizontal lines. Thus, for example, $A_1$ is married to $A_2$ and $C_2$ is married to $C_3$. A vertical line signifies a parent-child relationship. Thus, for example, $A_3$ and $A_4$ are parents of $B_3$ and $B_4$; $C_5$, $U_B$ and $C_7$ are children of $B_4$ and $B_5$ (and grandchildren of $A_3$ and $A_4$). $B_6$ is a single parent to $C_8$.

Each of $U_A$ and $U_B$ construct their family tree: their personal data constituting the main record, and data including names and possibly other data on related individuals constitute the sub-records. In fact, the family trees are a graphical representation of each of the users' personal data records.

Figure 8B:
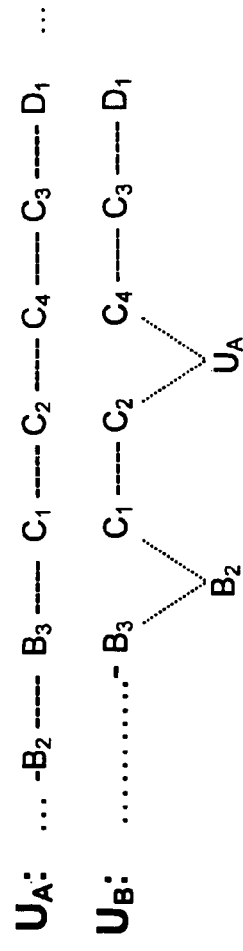
FIG. 8B illustrates an exemplary embodiment of a comparative data set (CDS) arrangement for each of users $U_A$ and $U_B$ arranged in a linear array of names.

The personal data records of each of users $U_A$ and $U_B$ are used to construct a CDS which according to one embodiment is a linear string of personal identifiers of each of the individuals represented in the family tree. The data relating to each of the users and constituting the main user-associated data record may be part or may not be part of the CDS. An example of such a linear CDS string formed for each of users $U_A$ (upper string) and $U_B$ (lower string) is shown in FIG. 8B. By one specific embodiment, the identifiers included in the data string are names. However, in addition or in the alternative other personal attributes, such as those noted above, may also be included. The order of individuals in the string is determined, in some embodiments, in accordance with a predefined hierarchy. In the exemplified string the sequence is in the following order of user relatives: father, mother, spouse, children, siblings, grandparents from father side (GPF), grandparents from mother side (GPM), other children of GPF, spouses of such children and their children, other children of GPM, spouses of such children and their children, and so forth.

Figure 8C:
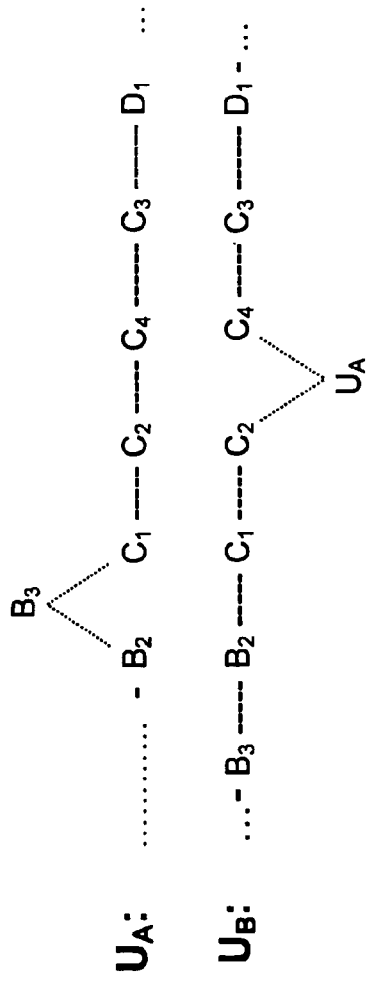
FIG. 8C illustrates the manner of matching of users $U_A$ and $U_B$ based on the CDS illustrated in FIG. 8B.

FIG. 8C shows two different ways of matching a sequence of nodes from the CDS strings of each of users $U_A$ and $U_B$ shown in FIG. 8B. In the upper part of the figure, a six-member continuous sequence out of the $U_A$ string is paired against a matching sequence out of the $U_B$ string. However in the case of user $U_B$, the link between $B_3$ and $C_1$ is indirect but goes through another member $B_2$ and similarly the link between $C_2$ and $C_4$ is also indirect and goes through $U_A$. However, in a manner analogous to that used to search for common sequence patterns of nucleic acid sequences in the field of computational biology, such additional members of the sequence are discarded and a match may be determined as shown graphically in the figure. In the lower part of the figure an alternative manner of matching is shown which is self explanatory. Typically, albeit non-exclusively, a common sequence of six members in two CDS strings may be considered a match with a high probability. However, for different societies the threshold of a length of a sequence to be considered a match may vary, e.g. contingent on the name use pattern in a given society (in a society where only a limited number of names are used, and where the name is used in the string, the threshold may be placed at a sequence length of higher than 6 that should be essentially the same in both strings.

In the specific example shown in FIG. 8C, there is an additional sequence of 3 individuals in the string that shows identity between the $U_A$ and $U_B$ strings— ... $C_6$-$D_2$-$D_3$- ... —which may serve to further verify the match.

In accordance with another embodiment a plurality of vectors are constructed each one consisting of two persons and their attributes. Examples of vectors are such constructed for the pairs of individuals $A_3$-$A_4$, $A_3$-$B_4$, $A_3$-$B_3$, $B_4$-$U_B$, $D_2$-$D_3$, ... etc. Merging the family trees may also be based on matching a predetermined number of such vectors in the two family trees.

Based on a match as described above, the two trees are merged to yield the illustrated merged tree.

Another manner of matching one family tree-related data record to another is based on defining for each such data record a plurality of short relationship-defining sequences, each one consisting of at least one pair of nodes that represent a first-degree relationship including parent-child, siblings, couple (including married and non-married). In the family tree shown in FIG. 8A example of such pairs are $B_4$-$B_5$, $B_4$-$C_5$, $U_B$-$C_6$, etc. In addition to pairs, such short sequences may also include a 3-member continuous sequence, a 4-member continuous sequence, etc. A 3-member sequence may, for example, include: grandparent-parent-child (e.g. $A_4$-$B_4$-$U_B$); child-parent-parent sibling (e.g. $U_A$-$B_3$-$B_4$); husband-wife-wife sibling (e.g. $B_2$-$B_3$-$B_4$); parent-child-child-in-law (e.g. $B_7$-$C_{10}$-$C_{11}$); etc. A 4-member sequence may include: child-father-grandfather-great grand parent (e.g. $D_3$-$U_B$-$B_5$-$A_5$); child-parent-parent sibling-spouse of such sibling (e.g. $U_A$-$B_3$-$B_4$-$B_5$); etc. In order to search for a matching family tree, other, related trees with identical sequences are searched. In the specific example of FIG. 8A, the family tree of $U_A$ and that of $U_B$ will both include pairs such as $A_4$-$A_3$, $A_4$-$B_4$, $B_4$-$C_5$, etc. Upon finding of at least a predetermined minimal number of such short sequences common to two family trees a match may be defined and the two trees can then merge. The predetermined minimal number of the short sequences is chosen so as to ensure a match with high probability.

Referring to FIG. 9, there is exemplified a flow diagram showing principal operations of managing person identifiers according to another embodiment of the invention.

In accordance with certain embodiments of the present invention, the management computer system, based on the person-related information, generates the person identifier in association with creating personal record (family tree) and/or sub-record related to the person (e.g. data related to the family tree node corresponding to the family tree member and his relationship to one or more other family tree members). The system operates to associate the person identifier with corresponding personal record and/or sub-records. The association may be provided by including the person identifier or derivatives thereof in the record and/or sub-records, and/or by providing the records and/or sub-records with links and/or other indications to corresponding person identifiers, etc.

In certain embodiments of the invention the person identifier is generated in a form of dataset comprising predefined set of building blocks (e.g. fields in the person identifier record or other logical entities) organized in predefined sequence order, wherein at least part of said building blocks comprises information derived from the respective personal record. In certain embodiments of the invention the building block(s) may hold the information in a coded form.

The building blocks may be organized in a string structure. The person identifier, by way of non-limiting example, may include the building blocks comprising relatives-related information: first name of the person ($1^{st}$ building block), family name of the person ($2^{nd}$ building block), name of father ($3^{rd}$ building block), name of mother ($4^{th}$ building block), mother's maiden name ($5^{th}$ building block), names of grandfathers ($6^{th}$ and $7^{th}$ building blocks) and grandmothers ($8^{th}$ and $9^{th}$ building blocks), etc. The order of the building blocks in the exemplified personal identifier is provided in accordance with respective relationships. In certain embodiments of the invention, the number of building blocks in different person identifiers may differ. For example, the person identifier may include a range of building blocks related to all sisters and brothers, said building blocks within the range being organized per date of birth. The number of building blocks in the range varies for different persons.

The information derived from the personal records may be held in the building blocks in the original form (as entered or otherwise obtained) and/or as derivatives thereof. For example, as names of persons, geographical names or other names may be differently spelled, the original data may be normalized by using a phonetic algorithm (e.g. double metaphone, SOUNDEX and/or alike) before storing in the building blocks. As a rule, phonetic algorithms are not enough to cope with the differences caused by different languages. For example, descendants of a person with name Jacob living in different countries may enter his name as Yaqub (Arabic), Hakob (Armenian), Jaakko (Finnish), Jacques (French), Jakob and Jacob (German), Iakovos (Greek), Ya'akov (Hebrew), Jacobo, Jaime and Yago (Spanish), etc. In certain embodiments of the present invention all known variations of certain personal, geographical or other names may be normalized before storing and then hold in a unified form (e.g. Jacob or some coded name for any of variety of names above) in addition or instead of storing the original form.

Those skilled in the art will readily appreciate that the teachings of the present invention related to information normalization are applicable in a similar manner to any other information stored or to be stored in the disclosed system.

Comparing the person identifiers includes comparing the corresponding building blocks (step 411). For example, in certain embodiments of the invention, the building blocks may be organized in certain predefined sequence order with empty blocks when necessary, and/or the building blocks may have pre-assigned sequential block numbers regardless of the preceding blocks actually comprised in the sequence (for example, as illustrated in Table 1 providing non-limiting example of pre-assigned sequential numbers to be used with the certain building blocks, the building block related to person's date of birth will have sequential number 30 regardless of other blocks, e.g. actual number of sisters and brothers).

TABLE 1

| Building blocks comprised in a person identifier | Pre-assigned sequential numbers |
| --- | --- |
| First name of the person | 1 |
| Family name of the person | 2 |
| Name of father | 3 |
| Name of mother | 4 |
| Mother's maiden name | 5 |
| Name of grandfather (father's father) | 6 |
| Name of grandfather (mother's father) | 7 |

TABLE 1-continued

| Building blocks comprised in a person identifier | Pre-assigned sequential numbers |
| --- | --- |
| Name of grandmother (father's mother) | 8 |
| Name of grandmother (mother's mother) | 9 |
| Names of sisters | 10-19 |
| Names of brothers | 20-29 |
| Date of person's birth | 30 |

In such and similar embodiments the person identifiers may be compared with the help of one or more algorithms comparing building blocks with the same sequential number. The system operates to determine whether the resulting number of substantially identical building blocks fits certain criterion (e.g. predefined number of non-empty substantially identical building blocks)—step 412. If positive, the person identifiers are considered as characterizing the same person. In certain embodiments of the invention the criterion may be configured, for example, as matching probability, weighed matching probability calculated in accordance with number of identical building blocks and information trustworthiness likelihood, and/or other wise.

In certain embodiments of the invention when the person identifier comprises building blocks, the process of comparing the person identifies for obtaining related personal record detailed with reference to FIG. 5A may be provided, for example, as following: The system may operate on all person identifiers stored in the database for initial comparing per predefined limited set of building blocks (e.g. only comprising information about person's name and date of birth), thus giving rise to likely matching person identifiers. Then, the rest building blocks may be compared operating on likely matching person identifiers.

In certain embodiments of the invention the system may continue comparing the person identifiers even if the resulting number of substantially identical building blocks does not fit certain criterion. Lack of information may be one of the reasons of inconsistency; accordingly, the system checks if one of comparing building blocks is empty while the other(s) comprises some information (step 413). If "YES", the system may request the user and/or one or more external sources for additional information, or ask the user to confirm that information in non-empty block(s) is right; and update the empty building block accordingly (step 414). If "NO", the system may check possibility of further correction of information comprised in the inconsistent building blocks (e.g. to ask user to correct information, provide user with certain variants of information to be selected, check possibility of normalization or re-normalization of names, etc.) and update the building blocks accordingly (step 415). After the update the system repeats operation of comparing the corresponding building blocks (step 416). The system operates to determine if the number of substantially identical (matching) building blocks fits certain criterion (step 417), and if "YES" the person identifiers are considered as characterizing the same person and the system thus updates the person identifier(s) in accordance with updated building blocks (step 418).

If the inconsistency occurs for building blocks being a part of certain range of building blocks (e.g. range 10-19 for sisters in Table 1), the system may also re-order the sequence of respective building blocks within the range and repeat the comparing process as above.

Optionally, if the number of substantially matching building blocks does not fit certain criterion, the system may modify comparing person identifiers by changing the predefined set of building block and generating new person identifiers in accordance with the new set. Such modification may be effective, for example, if information lacks in many blocks, if there is reasonable assumption of information incorrectness, etc. The modification may be provided by request of an authorized user and/or if the building blocks in the original person identifier fit certain criterion (e.g. more than 50% of blocks are empty). The system repeats the comparing operation of the modified person identifiers as detailed above. Typically, the modified person identifiers are generated as temporary objects for certain comparing operation(s).

In certain embodiments of the present invention one or more person identifiers may be ranked in accordance with their trustworthiness. The ranking may be provided in accordance with different criteria, e.g. total number of sub-records associated with certain person identifier, number of successful comparing operations, number of updates during comparing operations, source and/or time of last update, etc. Information in some personal records may pass special certification with regards to its trustworthiness, accordingly, person identifiers associated with such records and sub-records thereof may be used as a highly-ranked pattern for matching and appropriate ranking of the other person identifiers.

It is to be understood that the invention is not limited in its application to the details set forth in the description contained herein or illustrated in the drawings. The invention is capable of other embodiments and of being practiced and carried out in various ways. It should be noted that the invention is not bound by the specific algorithm of processing or specific structure. Those versed in the art will readily appreciate that the invention is, likewise, applicable to any other processing or presentation with equivalent and/or modified functionality which may be consolidated or divided in another manner.

It will also be understood that the invention further contemplates a machine-readable memory tangibly embodying a program of instructions executable by the machine for executing the method of the invention.

Those skilled in the art will readily appreciate that various modifications and changes can be applied to the embodiments of the invention as hereinbefore described without departing from its scope, defined in and by the appended claims.

The invention claimed is:

1. A method for automatic computerized identification of mergeable family trees stored in one or more databases, wherein each family tree comprises nodes representing individuals and connecting links connecting nodes defining a relationship sequence, each said node comprising data items on the individual represented thereby and each said node being linked to at least one other node, the method comprising:
    directing a computer to find matching nodes satisfying at least one of the following (i) a match in a majority of data items, (ii) a match in predetermined data items, (iii) having matched data items, said matched data items having pre-assigned weighting factors of respective data pieces about the individual, for which the average or total weighting factors satisfy a certain threshold condition;
    directing a computer to determine that two family trees are mergeable only if there are a predetermined number of matching nodes and connecting links therebetween common to each of the two family trees, said step of directing a computer to determine that two family trees are mergeable comprising-providing a plurality of first matrices associated with one of the two family trees and a plurality of second matrices associated with the other of the two family trees, each matrix comprising attributes on individuals that are linked to one another by a predetermined link;
    identifying substantially identical first and second matrices in said pluralities of first and second matrices; and
    generating data indicative of a merge of the family trees to one another if a number of the substantially identical matrices exceeds a predefined number; and
    directing a computer to utilize said generated data indicative of the merge for merging said at least two family trees determined to be mergeable.

2. A method according to claim 1, wherein said predetermined number of matching nodes in said determining step is six.

3. A method according to claim 1, wherein said directing of the computer for merging said at least two family trees determined to be mergeable comprises at least one of the following: (1) directing the computer to automatically initiate a merging process upon determination of the match; (2) directing the computer to allow a user-initiated process.

4. A method according to claim 3, wherein said merging comprises at least one of importing, exporting, transforming and superimposing by a process selected from the following:
    (a) merging a database record in the first family tree with a graphical display record in the one or more second family trees;
    (b) merging personal data records from two or more family trees;
    (c) merging a graphical display record in the first family tree with a graphical display record in one or more other family trees; and
    (d) consolidating person-indicating nodes comprised in the first family tree with person-indicating nodes in the one or more second family trees.

5. A method according to claim 3, further comprising displaying the merged family tree.

6. A method according to claim 1, carried out over a computer network.

7. A method according to claim 1, wherein at least one of the following is present: each matrix includes attributes on individuals with a direct family link; and the attributes are arranged in a predefined linear sequence.

8. A method according to claim 1, wherein the attributes are arranged in a predefined linear sequence, each attribute being given a numerical so as to define a vector for each sequence, step (b) comprising searching for substantially identical first and second vectors.

9. A management system for computerized identification of mergeable family trees, the management system comprising a hardware server system connected to a communication network to be accessible by users of the communication network through a client-server communication session, the hardware server system having access to a family trees relating database and comprising a computer readable non-transitory storage medium storing a processor utility preprogrammed for the performance of the method according to claim 1, the processor utility being preprogrammed for providing family trees management function operating to find in said database the at least two family trees which have said predetermined number of the matching nodes and connecting links therebetween common to each of the two family trees, and generate said data indicative of the merge.

10. A system in accordance with claim 9, further comprising:
    a storage utility for storing data indicative of the merged family trees.

11. A system according to claim 10, comprising:
- a subsystem configured to compare a first family tree with a second family tree; and
- a subsystem configured to consolidate the first family tree and the second family tree.

12. A computer comprising a processor and a program storage device readable by machine, tangibly embodying a program of instructions executable by the machine for carrying out the method according to claim 1.

13. A method according to claim 1, wherein said predetermined number of matching nodes and connecting links therebetween comprises a predetermined number of pairs of nodes, each said pair consisting of two nodes and a connecting link therebetween.

14. A method according to claim 1, wherein said predetermined number of matching nodes and connecting links therebetween comprises a sequence of said nodes connected by connecting links.

15. A method according to claim 1, wherein said finding and determining steps are performed automatically upon a request by a user.

16. A method according to claim 1, wherein said finding step finds matching nodes by finding a match in a majority of data items.

17. A method according to claim 1, wherein said finding step finds matching nodes by finding a match in predetermined data items.

18. A method according to claim 1, wherein said finding step finds matching nodes by finding nodes having matched data items, said matched data items having pre-assigned weighting factors of respective data pieces about the individual, for which the average or total weighting factors of the respective nodes satisfy a certain threshold condition.

* * * * *